United States Patent
Huang et al.

(10) Patent No.: US 11,341,214 B2
(45) Date of Patent: May 24, 2022

(54) MANAGED AUTHENTICATION FOR SOFTWARE COMPONENT ENVIRONMENT

(71) Applicant: Transposit Corporation, San Francisco, CA (US)

(72) Inventors: Tina Huang, San Francisco, CA (US); Adam H. Leventhal, San Francisco, CA (US)

(73) Assignee: Transposit Corporation, San Francisco, CA (US)

( * ) Notice: Subject to any disclaimer, the term of this patent is extended or adjusted under 35 U.S.C. 154(b) by 334 days.

(21) Appl. No.: 16/515,726

(22) Filed: Jul. 18, 2019

(65) Prior Publication Data

US 2021/0019383 A1    Jan. 21, 2021

(51) Int. Cl.
  *G06F 21/12*  (2013.01)
  *G06F 21/31*  (2013.01)
  *G06F 8/41*   (2018.01)
  *G06F 9/445*  (2018.01)

(52) U.S. Cl.
  CPC ............ *G06F 21/121* (2013.01); *G06F 8/427* (2013.01); *G06F 9/44505* (2013.01); *G06F 21/31* (2013.01)

(58) Field of Classification Search
  CPC ........ G06F 21/121; G06F 21/31; G06F 8/427; G06F 9/44505; G06F 8/31; G06F 21/44; G06F 21/57
  See application file for complete search history.

(56) References Cited

U.S. PATENT DOCUMENTS

| | | | | |
|---|---|---|---|---|
| 6,085,030 | A  * | 7/2000  | Whitehead | G06F 9/465 709/201 |
| 2017/0264612 | A1* | 9/2017  | Kaushal | H04L 63/168 |
| 2017/0330187 | A1* | 11/2017 | Kohli | G06Q 20/04 |
| 2018/0041543 | A1* | 2/2018  | Rahardjo | G06F 21/575 |

* cited by examiner

*Primary Examiner* — Mohammad W Reza
(74) *Attorney, Agent, or Firm* — Schwegman Lundberg & Woessner, P.A.

(57) ABSTRACT

Various embodiments support or provide for a software environment in which one or more software components (e.g., APIs) can be relationally composed together by logic (e.g., as defined using a computer language) to form an operation that abstracts details of the composition, such as details relating to the multiple API calls being made in the composition, to implement the logic of the operation. Depending on the embodiment, a particular software component environment can comprise one or more of the following: a data connector to an external software service; stored authentication information to establish access to the external software service; an operation having defined logic for using at least one data connector or another operation (e.g., from operation repository); or an endpoint for deploying the operation for access.

20 Claims, 16 Drawing Sheets

Add data connection

🔍 Search by name

Survey Monkey
transposit/survey_monkey
A survey Monkey integration provided by Transposit AWS Cloudwatch Events
transposit/aws_cloudwatch_event
An AWS Cloudwatch Events integration provided by Transposit

Dog.ceo
transposit/dog_ceo
A Dog.ceo integration provided by Transposit

Google Calender
transposit/google_calender
A Google Calender integration provided by Transposit Jira Name
_____

The identifier for this data connection when referenced in code

Operation
_____ ▽

(Optional) Code template for accessing the data connection

Cancel  [ Save ]

```
┌─────────────────────────────────────────────────────────────────────────────┐
│ ○○○ ⊞ Endpoints        ×  □ n02112137_3570.jpg (371x500) ×                  │
│ ← → C  🔒 https://console.transposit.com/t/tinah/slack_dog/deploy/endpoints │
│                                                              ☆ ○ ⊕          │
├─────────────────────────────────────────────────────────────────────────────┤
│ ⊞ TRANSPOSIT  tinah/slack_dog  ⊡ Fork this app    1408  Help & Docs  Tina Huang ▽│
│                                                                             │
│ Endpoints      │ hello_world                                                │
│                │ Deployed ▽                                                 │
│ API Key        │  ☐ Require API key                                         │
│                │  ☑ Require user sign-in                                    │
│ Scheduled Tasks│  ☐ Deploy as webhook                                       │
│                │ Transposit SDK                                             │
│ Hosted Page    │ This operation is accessible in the browser via the Transposit SDK.│
│                │  const transposit = new Transposit (                       │
│ Site Verification│   "tinah",                                               │
│                │    "slack_dog",                                            │
│                │    "https://api.transposit.com",                           │
│                │  );                                                        │
│                │  transposit.runOperation ("hello_world", { });             │
│                │                                                            │
│                │ webhook                                                    │
│                │ Deployed ▽                                                 │
│                │  ☑ Require API key                                         │
│                │  ☐ Require user sign-in                                    │
│                │  ☑ Deploy as webhook                                       │
│                │ Point the caller to https://api.transposit.com/app/tinah/slack_dog/api/v1/execute-│
│                │ http/webhook?api_key=dufkvqfnp9s9qmeknra1a1r491            │
│                │ cURL                                                       │
│                │ curl -X POST https://api.transposit.com/app/tinah/slack_dog/api/v1/execute-│
│                │ http/webhook?api_key=dufkvqfnp9s9qmeknra1a1r491            │
│                │ Save                                                       │
└─────────────────────────────────────────────────────────────────────────────┘
```

FIG. 14

MANAGED AUTHENTICATION FOR SOFTWARE COMPONENT ENVIRONMENT

TECHNICAL FIELD

The present disclosure relates generally to software components, and, more particularly, various embodiments described herein provide for systems, methods, techniques, instruction sequences, and devices that support software component relations.

BACKGROUND

Modern software applications commonly use various components, such as application program interfaces (APIs), in implementing their operations and functionalities. A particular API can define a set of software routines (e.g., methods or functions), protocols, or tools that permit interactions between different software components. Additionally, various APIs can enable a software application to interact with other external software applications, such as proprietary or third-party software services accessible over a network connection (e.g., the Internet). Examples of APIs can include, without limitation, APIs for Google Maps™, APIs created based on OpenAPI™, APIs for Marketo®, APIs for AWS® by Amazon®, and APIs for Salesforce®. It is not uncommon for a particular software application to make multiple calls to API components functions), such as multiple calls to one or more components of the same API, or multiple calls to components in different third-party APIs (e.g., provided by different third parties, such as Google® and Amazon®), in order to achieve a desired result. Unfortunately, these multiple calls can raise challenges with respect to development and/or maintenance of the particular software application.

For instance, to obtain a desired data result (e.g., table of records) from a third-party data source (e.g., Google Mail™ or Slack® platform), a given software application may include logic (e.g., source code) to call a function of a third-party API that returns a plurality of data records, and to call another function of the same third-party API to obtain more data for each of those records in the plurality. As another example, to obtain a desired number of data results from a third-party data source, a given software application may include logic that calls a function of a third-party API two or more times to obtain a desired number of data results from the third-party data source because a single call to the function provides less than the desired number of data results. Or alternatively, a given software application may include logic that calls a function of a third-party API to return from a third-party data source more data results than the given software application can handle and, as such, the logic further divides the received data results into portions of desirable data size (e.g., logic that implements a version of database pagination). In yet another instance, a given software application may include logic that obtains data results from two different third-party data sources and combines those data results to obtain a desired data result.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIGS. 10-14 present screen shots of example graphical user interfaces (GUIs) for a software component environment, according to some embodiments.

DETAILED DESCRIPTION

Figure 1:
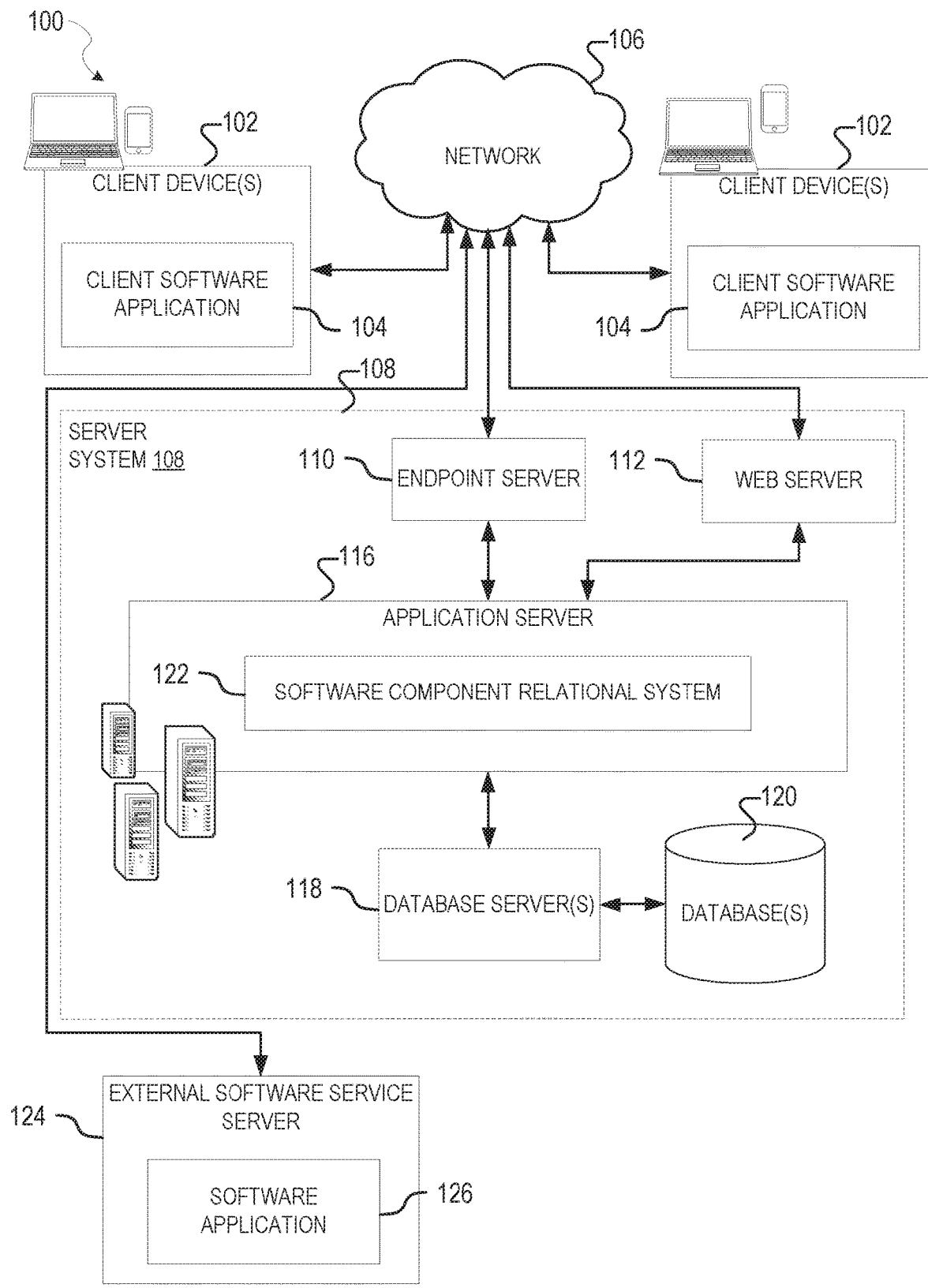
FIG. 1 is a block diagram showing an example data system that includes a software component relational system that supports a set of software component environments, according to some embodiments.

Various embodiments described herein support or provide for a software environment in which one or more software components (e.g., APIs) can be relationally composed together by logic (e.g., as defined using a computer language, such as JavaScript or Standard Query Language (SQL)) to form an operation that abstracts details of the composition, such as details relating to one or more API calls being made in the composition to implement the logic of the operation. Such a software environment is also referred to herein as a software component environment. As used herein, an operation of a given software component environment can be regarded as a composed software component. Depending on the embodiment, a particular software component environment can comprise one or more of the following: a data connector to an external software service; stored authentication information, such as an authentication token (e.g., obtained via Open Authorization (OAUTH)) or key, to establish access to the external software service; an operation having defined logic (e.g., that specifies use of at least one data connector or another operation of a software component environment); or an endpoint for deploying the operation for access (e.g., public or private access). Various embodiments described herein can support/provide for a plurality of separate software component environments, where each environment can serve as a separate virtual container (or project) of operations. A given software component environment can logically operate as an abstraction layer (e.g., a software component abstraction layer) between a client software application (e.g., a web-based application hosted on a web server, or a standalone software application operating on a client device) and a set of external software services, such as third-party software services (e.g., Survey Monkey® platform and Yelp® platform). In doing so, a set of operations provided by a given software component environment can form one or more abstracted APIs, each of which is built on logic that seamlessly handles calls to one or more other APIs to achieve a desired result (e.g., formatting, pagination, joining of different data sources, caching, automatic authentication, etc.). Additionally, by providing (e.g., defining) this logic for a particular abstracted API, a user (e.g., developer) can implement a high-level description of actions the developer desires to execute by the particular abstracted API, and an engine of an embodiment (e.g., parser and executor) can seamlessly handle calls to the one or more other APIs in accordance with the written logic.

For some embodiments, an engine (e.g., executor) implements a layer (hereafter, interface abstraction layer) that abstracts one or more interface (e.g., API) definitions, descriptions, standards, or specifications, such as OpenAPI, Web Services Description Language (WSDL), Web Application Description Language (WADL), Open Data Protocol (OData), Google Cloud Endpoints, and the like. In particular, for some embodiments, the interface abstraction layer can map a plurality of interface definitions, descriptions, standards or specifications into a unified representation, which can be implemented as a unified set of actions (e.g., actions for pagination, error handling, etc.) executable by the engine (e.g., on behalf of an operation of a software component environment). In this way, an interface abstraction layer can operate as a unifying layer between different APIs and make their interfaces appear the same with respect to logic of an operation of a software component environment. Additionally, by way of an interface abstraction layer and its unified set of actions, various embodiments can enable logic of an operation of software component environment to be agnostic of the external software service being operated upon, and can enable the logic of the operation to access APIs defined by/based on multiple different API definitions/descriptions/standards/specifications. The interface abstraction layer can enable various embodiments to readily add support for an API defined by, or based on, an existing or new API definition/description/standard/specification.

During operation, an engine of an embodiment can parse and translate a logic of an operation of a software environment component (e.g., logic defined using a computer language, such as JavaScript or SQL) into one or more actions selected from the unified set of actions supported by the interface abstraction layer (e.g., API abstraction layer) of the engine. The interface abstraction layer can then map the one or more actions resulting from the logic to one or more corresponding API calls (for one or more respective data connectors referenced by the logic) defined by/based on an interface definition/description/standard/specification. (e.g., OpenAPI, WSDL, OData, etc.) supported by the interface abstraction layer. The engine can execute the one or more corresponding API calls (e.g., with respect to one or more data connectors referenced in the logic of the operation).

Through a software component environment of some embodiments, a set of actions performed by an operation of the software component environment can abstract away and handle complexities of using different software components (e.g., APIs) by different third-party providers within a client software application, such as complexities relating to authentication, retries, caching, data formatting, pagination, filtering, joining different data sources (e.g., combining data across multiple APIs), optimized execution, and the like. Accordingly, a user (e.g., software development entity) can use a software component environment (described herein) to compose an operation that the user can call within their client software application, where: the operation's logic can use data connector operators to effectively make a plurality of component calls (e.g., third-party API calls) and aggregate data from those component calls to generate a desired result for the client software application, while the software component environment seamlessly manages technicalities of those component calls, such as authentication, to access the component calls using a plurality of different user account credentials or keys (e.g., API keys).

For some embodiments, an operation comprises logic that translates to a set of actions that is to be performed with respect to an external software service by way of a data connector. For instance, the logic of an operation can comprise code written in a computer language, such as SQL, JavaScript, Python, Perl, and the like. As noted herein, for some embodiments, the logic is translated into a set of actions selected from a unified set of actions supported by an interface abstraction layer of an engine. The operation can perform an action with respect to the external software service by referencing the data connector in the logic of the operation, such as referencing the data connector in a SQL statement of the operation. Once the operation is created in a software component environment, it can be deployed (e.g., as a HTTP or webhook endpoint) for public or permission-based access, scheduled for (e.g., periodic) execution, or used internally within the software component environment. By its actions, an operation can facilitate a variety of functions, such as joining, filtering, formatting, transforming, pagination, caching, and the like, with respect to one or more external software service (via their respective data connectors). Some embodiments comprise a parser and an executor (e.g., action scheduler) to perform an operation, where the parser generates a set of actions (selected from the unified set of actions supported by the interface abstraction layer) based on parsing the logic (e.g., SQL statement or JavaScript code) of the operation, thereby translating the logic to the set of actions. The executor performs the generated set of actions with respect to one or more external software services. For some embodiments, the parser and the executor form at least a portion of a relational component engine that enables performance of operations within a software component environment.

For some embodiments, a given software component environment is associated with a set of data connectors to external software services (e.g., AWS® and SendGrid® Email services) and an operation is defined within the software component environment such that the logic of the operation translates to a set of actions (e.g., selected from a unified set of actions supported by an interface abstraction layer) to be performed with respect to the one or more of the external software services through their respective data connectors. For instance, the logic of the operation can reference the data connector (e.g., by the data connector's alias within the software component environment), thereby accessing the external software service through the data connector. Each data connector can support a set of data connector operations for its respective external software service. The logic of an operation of a software component environment can call upon a data connector operation supported by the data connector by referencing the data connector (e.g., by the data connector's alias) and then naming the supported data connector operation. For some embodiments, where the data connector operation returns a set of data results, the call to the data connector operation can be used as a virtual data source within the logic of an operation (e.g., logic comprises a SQL statement that references the data connector operation as a table from a single relational database). Additionally, similar to a data connector operator, an operation of a software component environment can call on and use another operation of the software component environment (or of another software component environment) as a virtual data source (e.g., logic comprising a SQL statement referencing the other operation as a table from a single relational database). In this way, various embodiments enable creation of a new operation (e.g., composable component) that is composed of calls to one or more existing operations stored by the various embodiments (e.g., stored in an operation or component repository).

For some embodiments, within a software component environment, each data connector (e.g., added to the softer component environment) is associated with a name or alias (e.g., unique name or alias), which can be used by a logic of an operation of the software component environment to reference (e.g., uniquely reference) a particular data connector within the software component environment. By assigning a name or alias to each data connector within a software environment, each data connector can an association (e.g., a pairing or binding) between a particular data connection type (e.g., an existing third-party software services, such as Google Mail™, Google Calendar™, Facebook®, Twitter®, etc.) and a particular set of configurations or settings (e.g., user credentials for that data connection type). Additionally, with naming/aliasing, a given software component environment can comprise two or more data connectors of a similar data connection type (e.g., Google® Calendar data connector) that are identified by different names/aliases and associated with different configuration or setting information. For instance, the use of names/aliases permits multiple data connectors of a similar data connector type (e.g., data connector Google® Calendar) to be associated with different authentication information (e.g., name/alias uniquely identifies a pairing between a data connector type and specific authentication information). For instance, within a given software component environment, a first Google® Calendar data connector aliased "work calendar" can be associated with authentication information (e.g., based on credentials of a user account with a production environment) for accessing a user's work calendar, while a second Google® Calendar data connector aliased "personal calendar" can be associated with authentication information (e.g., based on credentials of a user account associated with an end user) for accessing a user's personal calendar.

The set of data connector operations supported by a particular data connector can be dependent on the external software service associated with (e.g., being accessed via) the particular data connector. Accordingly, a first data connector supporting a first set of data connector operations with respect to a first type of external software service (e.g., Gmail) can differ from a second data connector supporting a second set of data connector operations with respect to a second type of external software service (e.g., Google Maps™). A particular data connector operation for a given external software service can abstract (e.g., hide) the one or more calls being made to native components (e.g., API native to) the given external software service to achieve its result. For instance, a data connector operation of "clear_calendar" with respect to a data connector to Google Calendar™ can be implemented using one or more calls to the Google Calendar™ API, but such calls would be hidden from the logic of an operation of a software component environment that calls on the "clear_calendar" data connector operation.

The following illustrates the logic of an example operation of a software component environment, where the logic comprises an SQL statement that: references an operation "get_users" of a data connector "connection1" to a first external software service (e.g., PagerDuty®); references an operation "list_users" of a data connector "connection2" to a second external software service (e.g., Slack® E-mail Service); and joins information from these two data connection operations as if each result provides a virtual database table that can be joined together on a column "id":

SELECT*FROM connection1.get_users AS A JOIN connection2.list_users as B ON A.id=B.id WHERE A.lastName='smith' LIMIT 50

The "LIMIT 50" can cause the software component environment to automatically implement pagination into the data results returned by processing the SQL statement when the operation is executed. This can be true even where pagination is not natively supported by either the first or second external software services, or support for pagination differs between the first and second external software service (e.g., the first external software service supports pagination for limits of 10 and the second external software service supports pagination for limits of 25).

The following illustrates the logic of an example operation of a software component environment, where the logic comprises JavaScript statements that: run an operation "get_events" of a data connector "connection1" to a first external software service (e.g., GitHub®); and then submits a SQL query that references an operation "list_objects" of a data connector "connection2" to a second external software service (e.g., AWS® S3):

```
function run(params) {
    api.run("connection1.get_events");
    api.query("SELECT * FROM connection2.list_objects");
}
```

The following illustrates the logic of another example operation of a software component environment where one can accomplish the equivalent of a SQL statement with JavaScript alone. In particular, the following JavaScript statement runs an operation "get_events" of a data connector "connection1" to a first external software service (e.g., GitHub®) with a limit option, which can provide data results with pagination (e.g., limit of 50 results per a "page") without use of an SQL statement:

api.run("connection1.get_events", {category: surfing}, {limit: 50});

Depending on the embodiment, JavaScript or the like (e.g., Perl, Python, etc.) can be used (e.g., in place or conjunction with a SQL statement) to define the logic of an operation described herein, thereby enabling a user (e.g., software development entity, such as an independent application developer) to implement specific logic (e.g., additional business logic) that would not otherwise be possible by an SQL statement or by an SQL statement alone.

Some embodiments provide authentication management with respect to a software component environment, which can provide an operation of a software component environment with access to an external software service, via a connector, where the access is authenticated using one or more stored authentication information (e.g., stored authentication tokens obtained by an Open Authorization (OAUTH) flow) associated with the software component environment. Depending on the embodiment, stored authentication information can include stored authentication information obtained via authentication of credentials of a user account associated with an end user (e.g., client software application user or consumer), or credentials of a user account associated production environment (e.g., provided by development entity for all end users). For instance, a given software component environment can be associated with stored authentication information (e.g., stored authorization token) obtained based on authentication of credentials of a user account associated with production, and a data connector of the software component environment can be configured to use that stored authentication information to access an external software service for all client devices that call an operation of the software component environment that uses (e.g., references) the data connector.

For some embodiments, a graphical user interface (GUI) (e.g., web page) is provided to facilitate creation and management of a software component environment and its associated elements (e.g., operations, data connectors, storage authentication information, etc.) by a user, such a development or an administrative user of a software development entity. Through the GUI, a user can, for example: generate a new software component environment; associate the new software component environment with stored authentication information generated based on authentication of credentials of a user account associated with an entity (e.g., software development organization) or end-user; associate the new software component environment with a new data connector to an external software service; configure the new data connector to use the stored authentication information (e.g., stored authentication token for development use or live/production use) to establish access to the external software service; add a new operation to the software component environment; add logic (e.g., SQL query or JavaScript source code) to the new operation, where the logic calls a data connector operation with respect to the new data connector; and deploy the new operation as a privately/publicly-accessible endpoint (e.g., via a Hypertext-Transfer Protocol (HTTP) Universal Resource Locator (URL) request).

For some embodiments, one or more data portions of a software component environment, such as logic of an operation (e.g., SQL statement or JavaScript source code), data connection setting information, stored authentication information, and the like, are stored in a repository (e.g., version-controlled source code repository, which may be associated with an individual software component environment), which may be publicly or privately accessible by other users (e.g., a user of another software component environment).

By use of various embodiments, a platform can be provided that assists in creating software applications that are based on composition of calls to different software components (e.g., different third-party API calls) associated with different external software services (e.g., third-party software services). Various embodiments can enable central administration of authentication and user management with respect to operations that comprise calls to one or more different software components. Various embodiments can also unify a number of mechanisms associated with API calls, such as pagination and error handling. For instance, with an embodiment, an operation can be created for use by a client software application where the operation connects to an external software service (e.g., third-party data source) using a software development entity's authentication credentials, and the operation connects to another external software service (e.g., another third-party data source) using a login flow that permits an end user of the client software application to connect to their own data on the other external software service. After the end user login flow, such an embodiment can further maintain a mapping of the end user's record to the data connection authenticated using the end user's authentication credentials. Use of some embodiments provide a unified software interface for interacting with a diversity of software components (e.g., APIs), thereby enabling software components from different providers (e.g., third-party providers) to be used in operational logic in a standard manner.

As used herein, an application program interface (API) can define or specify a set of routines (e.g., methods or functions), data structures, object classes, variables, protocols, or tools that can be used to implement a software application (e.g., by importing, instantiating, or calling aspects of the API in the source code of the software application). An API can, for example, be associated with a web-based system, an operating system, a database system, a software library, a hardware component, or another software application.

As used herein, an external software service can comprise a software application that is operating externally with respect to a client software application and with respect to a software component environment of some embodiments described herein. An external software service can comprise a software application operating locally with respect to a software component environment described herein (e.g., on the same computing device) or a software application that is operating remotely with respect to the software component environment and accessible over a communications network. A given external software service can be one being operated or managed by a third-party entity (e.g., a service provider entity, such as Google®, Amazon®, Salesforce®, or Survey Monkey®) that is different from the entity (e.g., software development entity, such as an independent application developer) that is using the software component environment to develop a client software application.

As used herein, an endpoint can comprise a computing entity or resource (e.g., server or server-side software application) that can be referenced by another computing entity or resource (e.g., client device or client-side software application). Generally, an endpoint can be accessed over a network and, as such, can be referenced by way of an address, such as a Universal Resource Locator (URL). Additionally, depending on the embodiment, an endpoint can receive data (e.g., receive a data request, such as request messages) or send data (e.g., transmit data responses, such as response messages). An example of an endpoint can include, without limitation, an application programming interface (API) (e.g., that is associated and interfaces with, and a platform provided by, an embodiment described herein), a web service endpoint, an Hypertext-Transfer Protocol (HTTP) endpoint, or a webhook endpoint. Where an endpoint comprises an API for a platform provided by an embodiment, the API can be part of a software development kit (SDK) associated with the platform that source code of a client software application can use (e.g., interface with). For various embodiments, an endpoint is associated with (e.g., permits access to) an operation of a software component environment, where the endpoint is generated as a result of the operation being deployed for private or public access. An example URL for a webhook endpoint to which a HTTP POST or GET command can be performed comprises:

https://api.software-component-provider.com/app/user1/example_software_component_environment/api/v1/execute-http/
webhook?api_key=dfkjadIr853490tuiejga908j4.

The description that follows includes systems, methods, techniques, instruction sequences, and devices that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a software component relational system 122 that supports a set of software component environments, according to some embodiments. By including the software component relational system 122, the data system 100 can enable creation and management of a set of software component environments as described herein, where each software component environment can provide an operation accessible by a client software application 104 of one or more client devices 102.

As shown, the data system 100 includes multiple client devices 102, a server system 108, an external software service server 124, and a network 106 (e.g., including the Internet, a wide-area-network, local-area-network, wireless network, etc.) that communicatively couples them together. Each client device 102 can host a number of applications, including a client software application 104. Each client software application 104 may communicate data with one or more other instances of the client software application 104, or with the server system 108 via a network 106. Accordingly, each client software application 104 can communicate and exchange data with another client software application 104 and with the server system 108 via the network 106. Additionally, the external software service server 124 can communicate and exchange data with the server system 108 via the network 106. The data exchanged between the client applications 104, between a client software application 104 and the server system 108, and between the server system 108 and the external software service server can include, without limitation, data objects, requests (e.g., API calls), responses (e.g., API responses), public/private keys (e.g., API keys), hash values, access rights data, license data, and authentication data (e.g., authentication tokens).

The external software service server 124 can host a software application 126 that provides a software service, which is external to a computing entity (e.g., the client devices 102 or the server system 108) but accessible by the computing entity over the network 106 via a software component (e.g., an API associated with the software service). For instance, a software application (e.g., the software component relational system 122) on the server system 108 can access the external software service provided by the external software service server 124 by accessing (e.g., calling) an API at the server system 108. The external software service server 124 can comprise one or more computing devices that host the software application 126 providing a software service. In this way, the external software service server 124 can support a software service (e.g., Google Mail™ or AWS®) provided by a third-party organization, such as such as Google® and Amazon®.

The server system 108 provides server-side functionality via the network 106 to a particular client software application 104. While certain functions of the data system 100 are described herein as being performed by the software component relational system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where a client device 102 provides enhanced data object functionality.

The server system 108 supports various services and operations that are provided to the client software application 104 by the software component relational system 122. Such operations include transmitting data from the software component relational system 122 to the client software application 104, receiving data from the client software application 104 to the software component relational system 122, and the software component relational system 122 processing data generated by the client software application 104. This data may include, for example, data objects, requests, responses, public/private keys, hash values, access rights data, license data, and authentication data. Data exchanges within the data system 100 may be invoked and controlled through operations of software component environments available via one or more endpoints, or functions available via one or more user interfaces (UIs) of the client software application 104, which may include web-based Is provided by the server system 108 for presentation at the client device 102.

With respect to the server system 108, an endpoint server 110 is coupled to an application server 116, which hosts the software component relational system 122. According to some embodiments, the endpoint server 110 provides a set of endpoints that facilitate access (e.g., public or private access) to deployed operations of one or more software component environments, which are created and managed by the software component relational system 122. The application server 116 is communicatively coupled to a database server 118, which facilitates access to a database 120 that stores data associated with the application server 116.

The endpoint server 110 can receive and transmit data (e.g., API calls, commands, data objects, requests, responses, public/private keys, hash values, access rights data, license data, and authentication data) between the client device 102 and the application server 116. Specifically, the endpoint server 110 can provide a set of HTTP endpoints, webhooks, or APIs (e.g., routines and protocols) that can be called by the client software application 104 in order to invoke an operation of a software component environment supported, created, and managed by the software component relational system 122 of the application server 116. The endpoint server 110 exposes one or more operations created (e.g., developed) in one or more software component environments supported by the software component relational system 122 of the application server 116.

Through one or more web-based interfaces (e.g., web-based UIs), the web server 112 can support various functionality of the software component relational system 122 of the application server 116 including, without limitation: user registration; login functionality; software component environment functionality (e.g., creation and management of a software component environment and its various elements, such as operations, data connections, stored authentication information, endpoints, etc.); and data object operations (e.g., generating, storing, retrieving, encrypting, decrypting, transferring, access rights, licensing, etc.).

The application server 116 hosts a number of applications and subsystems, including the software component relational system 122, which supports various functions and services with respect to various embodiments described herein. For instance, the software component relational system 122 can support one or more of the following functions: generation of a new software component environment; association of the new software component environment with stored authentication information (e.g., stored authentication token) generated based on authentication of credentials of a user account associated with an entity (e.g., a software development organization) or end-user; association of the new software component environment with a new data connector to an external software service; configuration of the new data connector to use the stored authentication information (e.g., stored authentication token for development use or live/production use) to establish access to the external software service; addition of a new operation to the software component environment; addition of logic (e.g., SQL query or JavaScript source code) to the new operation, where the logic calls a data connector operation with respect to the new data connector; and deployment of the new operation as a privately/publicly-accessible endpoint (e.g., via a Hypertext-Transfer Protocol (HTTP) Universal Resource Locator (URL) request). More regarding various embodiments of a software component relational system are described with respect to FIG. 2.

The application server 116 is communicatively coupled to a database server 118, which facilitates access to database(s) 120 in which may be stored data associated with the software component relational system 122. Data associated with the software component relational system 122 can include, without limitation, metadata (e.g., metadata files) and source code data (e.g., source code files) associated with a software component environment. Examples of metadata can include, without limitation: a manifest file that describes a configuration of a particular software component environment, such as a location of source code for one or more operations associated with the particular software component environment; documentation file for operations (e.g., README files); and license data, which can describe license information associated with the particular software component environment or particular operations thereof. Examples of source code data can include, without limitation, JavaScript files and SQL files. For some embodiments, the databases 120 can implement a version control or source control repository to store various data associated with the software component relational system 122, such as source code defining logic of one or more operations of a software component environment. For example, one or more of the databases 120 can be used to implement a repository based on Git, which can version-control metadata or source code data associated with a particular software component environment.

Figure 2:
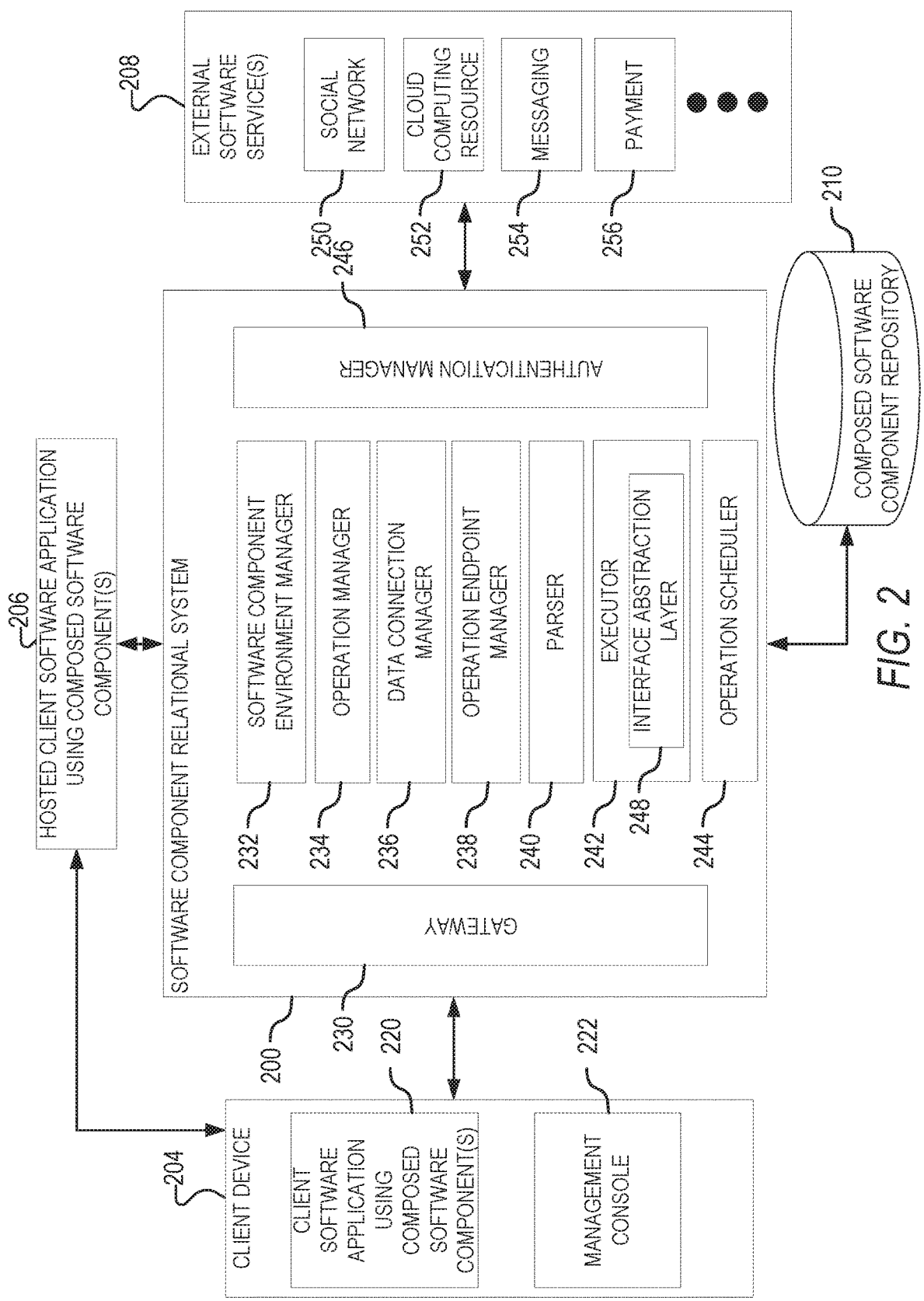
FIG. 2 is a block diagram illustrating an example software component relational system, according to some embodiments.

FIG. 2 is a block diagram illustrating an example software component relational system 200, according to some embodiments. As shown, the software component relational system 200 can communicate with: a client device 204; a hosted client software application 206, which uses one or more composed components of a software component environment created/managed by the software component relational system 200; one or more external software services 208, which are accessible via one or more software components, such as one or more related APIs; and a composed software component repository 210, which can facilitate version control or source control of data associated with the software component relational system 200, such as logic data (e.g., source code data) for operations of software component environments created/managed by the software component relational system 200. For various embodiments, the components and arrangement of components shown may vary from what is illustrated in FIG. 2. For instance, the software component relational system 200 can include more or fewer components than the components shown in the FIG. 2.

Depending on the embodiment, the client device 204 can communicate with the software component relational system 200 by: a client software application 220 operating on the client device 204 that uses one or more composed components of a particular software component environment created/managed by the software component relational system 200; or a management console 222 on the client device 204 that can manage functions or aspects of the software component relational system 200 described herein (e.g., creation/management of software component environments, operations, data connections, stored authentication information, endpoints, etc.). For instance, the client software application 220 can call on one or more operations of the particular software component environment via endpoints associated with those operations. A call to one or more of the operations can result in data being returned from the software component relational system 200 to the client software application 220, which the application 220 can then use in its own processes. For some embodiments, the management console 222 comprises a client application, such as a web browser application, that can access a web-based UI (e.g., web page) that is provided by the software component relational system 200 and that facilitates user (e.g., administrative or development user) interaction with the software component relational system 200.

The hosted client software application 206 can represent a client software application operating on a computing device (e.g., server) remote with respect to the client device 204. Like the client software application 220, the hosted client software application 206 can call on one or more operations of a particular software component environment via endpoints associated with those operations. The hosted client software application 206 can comprise a web-based client application that an end user at the client device 204 can access over a network (e.g., through a web browser client application on the client device 204).

The software component relational system 200 comprises a gateway 230, a software component environment manager 232, an operation manager 234, a data connection manager 236236, an operation endpoint manager 238238, a parser 240240, an executor 242 executer 242, an operation scheduler 244244, and an authentication manager 246246. For some embodiments, the parser 240 and the executor 242 executer 242 form a component relational engine of the software component relational system 200. As shown, examples of external software services 208 that an operation of a software component environment can access with (e.g., respectively via their related API calls) can include, without limitation, a social network 250 (e.g., Facebookt, etc.), a cloud-computing resource 252 (e.g., cloud-based storage, processing, database by AWS®), electronic messaging 254 (e.g., web-based e-mail, such as Google Mail™) and a payment service 256 (e.g., Paypal®, Stripe®, etc.), Other examples can include, without limitation, a customer relation management platform (e.g., Salesforce®), IT platforms (e.g., Twilio®, PagerDuty®, etc. and a marketing platform (e.g., Marketo®, Survey Monkey®, etc.).

The gateway 230 can facilitate or support communication between a client software application and the software component relational system 200, and in particular, can support user access of data through the software component relational system 200. For some embodiments, the gateway 230 serves as a gateway for client requests to the software component relational system 200. For instance, the gateway 230 can receive, from a client software application, a request, such as a HTTP request with a URL address or a generic API call request, that is associated with a particular endpoint of a specific operation of a software component environment. Based on the request, the gateway 230 can identify the logic (e.g., source code data) of the specific operation and cause the logic to be scheduled for execution (e.g., via the parser 240 and the executor 242).

The software component environment manager 232 can facilitate or support management of a set of software component environments on the software component relational system 200, which can include creation, configuration, and deletion of a software component environment on the software component relational system 200. Data for a particular software component environment can be stored on the composed software component repository 210.

The operation manager 234 can facilitate or support management of a set of operations of a particular software component environment on the software component relational system 200, which can include adding (e.g., associating or creating), configuring (e.g., adding or modifying logic), scheduling, and removing (e.g., disassociating or deleting) an operation with respect to the particular software component environment. When an operation is initially created for the particular software component environment, the operation manager 234 can present a user (e.g., software development entity) with an operation composer (e.g., web-based UI) that permits a user to add or modify logic (e.g., source code) with respect to the created operation. The added or modified logic of an operation can be stored on the composed software component repository 210, which can facilitate version control or source control over the logic.

The data connection manager 236 can facilitate or support management of a set of data connections with respect to a particular software component environment on the software component relational system 200, which can include adding (e.g., associating or creating), configuring, and removing (e.g., disassociating or deleting) an available (e.g., pre-built) data connection with respect to the particular software component environment. Configuration of a data connection by the data connection manager 236 can comprise, for example, assigning an alias to the data connection, which can reference the data connection in operation logic, or adjusting a data connection setting that causes the data connection to use specified stored authentication information (e.g., associated with an end user or developer/production) to establish access to an external software service (e.g., one of the external software services 208) through the data connection. As noted herein, by assigning a name or alias to a given data connector, the given data connector can comprise an association (e.g., a pairing or binding) between a particular data connection type (e.g., an existing third-party software services, such as Google Mail™, Google Calendar™, Facebook®, Twitter®, etc.) and a particular configuration or setting information (e.g., user credentials). Examples of data connection types can include, without example, data connections to existing third-party software services (e.g., Google Mail™, Facebook®, Twitter®, etc.) or data connections (to external software services) that are custom built on the software component relational system 200 by a user (e.g., software development entity). For some embodiments, through the data connection manager 236, a custom data connection can be created for use by several software component environments created managed by the software component relational system 200, or by a particular software component environment. For some embodiments, once a given data connection is added to a particular software component environment, one or more operations of the particular software component environment can use the given data connection. Depending on the embodiment, a particular software component environment can be associated with a plurality of data connections to the same external software service (e.g., one of the external software services 208), but each data connection can have a different configuration. For instance, within the particular software environment, a first data connection to an external software service can be assigned a first alias and configured to use stored authentication information associated with (e.g., generated based on) a software development entity's user account, while the second data connection to the same external software service can be assigned a second alias and configured to use stored authentication information associated with (e.g., generated based on) a user account of an end user of a client software application.

The operation endpoint manager 238 can facilitate or support management of a set of endpoints for accessing operations of a particular software component environment on the software component relational system 200, which can include adding (e.g., associating or creating), configuring, and removing (e.g., disassociating or deleting) an endpoint of an operation with respect to the particular software component environment. Configuration of a data connection by the operation endpoint manager 238 can comprise, for example, identifying the type of endpoint (e.g., HTTP, webhook, traditional API, etc.), adjusting access control (e.g., public access or private/restricted access), or assigning an API key to the endpoint. For some embodiments, a given operation can be associated with a plurality of endpoints within a particular software component environment, where each of the endpoints may be different configurations.

To execute a particular operation (e.g., in response to an endpoint request or scheduling), the parser 240 can facilitate or support parsing the logic (e.g., source code data) of the particular operation and generating a set of actions to be performed in order to execute the operation, thereby translating the logic to the set of actions. For some embodiments, the set of actions generated are selected from a unified set of actions supported by the executor 242 (e.g., via an interface abstraction layer 248). Additionally, for some embodiments, the logic of the particular operation can be performed with respect to a particular data connection that is associated with (e.g., added to) the software component environment of the particular operation. Depending on the embodiment, the logic of the particular operation can reference a particular data connection (e.g., to Google Mail™) by its name (e.g., "Google_Mail") or assigned alias ("gmailconn1"), which can permit a plurality of data connections to the same external software service (e.g., Google Mail™) where each data connection has a different alias. Within the logic of the particular operation, the logic can call a specific data connection operation (e.g., "get_profile") with respect to a particular data connection (e.g., data connection to Google Mail™), which can be facilitated by a call to the specific data connection operation with respect to an alias assigned to the particular data connection "gmailconn1.get_profile"). For some embodiments, the set of actions generated by the parser 240 depends on the logic of the particular operation being parsed.

For some embodiments, where the logic references a particular data connection or calls a specific data connection operation with respect to the particular data connection (e.g., using an name/alias associated with the particular data connection), one or more actions (in the generated set of actions) can correspond to one of those references/calls cause the software component relational system 200 (e.g., the executor 242) to perform a set of software component calls (e.g., API calls) that relate to an external software service (e.g., one of the external software services 208) associated with the particular data connection. For instance, where "gmailconn1.get_profile" represents a call within operation logic to the data connection operation "get_profile" with respect to the data connection "gmailconn1" to Google Mail™, one or more actions generated by the parser 240 can cause the software component relational system 200 (e.g., the executor 242) to perform a set of Google Mail™ API calls. In this way, the software component relational system 200 can permit the logic of the particular operation to remain high-level, to use standard calling mechanisms (e.g., data connection referencing and data connection operation calls) across different external software services, and to obviate the need for the logic of the particular operation to handle the specific details involved in performing a set of API calls (e.g., third-party API calls, such as Google Mail™ API calls) to generate desired results, such as API access authentication, filtering, caching, and pagination of returned results.

The executor 242 can facilitate or support execution of a set of actions generated (e.g., translated) by the parser 240 with respect to the logic (e.g., source code) of a particular operation of a software component environment. An action can represent a unit of work to be executed by the executor 242. Additionally, for some embodiments, an action is one selected from a unified set of actions supported an interface abstraction layer 248 that is included, or otherwise implemented, by the executor 242. Depending on the embodiments, the interface abstraction layer 248 can be implemented within the executor 242, at least in part, as mapping data that maps or translates an action from the unified set of actions that map to one or more an interface definition/description/standard/specifications supported by the interface abstraction layer 248, which results in to one or more API calls defined by/based on those one or more interface definition/description/standard/specifications. The interface abstraction layer 248 can enable the executor 242 to abstract one or more interface (e.g., API) definitions, descriptions, standards, or specifications, such as OpenAPI, Web Services Description Language (WSDL), Web Application Description Language (WADL), Open Data Protocol (OData), Google Cloud Endpoints, and the like. In particular, the interface abstraction layer 248 can enable the executor 242 to map a plurality of interface definitions, descriptions, standards or specifications into a unified representation comprising a unified set of actions executable by the executor 242. During operation, the executor 242 can use the interface abstraction layer 248 to map one or more actions to one or more interface definition/description/standard/specifications (e.g., OpenAPI, WSDL, OData, etc.) supported by the interface abstraction layer 248, which results in the parser 240 (for a logic of an operation) generating one or more API calls (for one or more respective data connectors referenced by the logic) defined by/based on those one or more interface definition/description/standard/specifications. The executor 242 can then execute those one or more API calls (e.g., with respect to one or more data connectors referenced in the logic of the operation).

Depending on the embodiment, the executor 242 can cause each action to execute within its own thread, or spawn a new thread. As described herein, one or more actions in the set of actions being executed by the executor 242 can map to a set of API calls (e.g., via the interface abstraction layer 248) that the executor 242 makes to one or more external software services (e.g., one or more of the external software services 208) associated with those API calls. For some embodiments, the executor 242 comprises a queue that maintains a list of actions, each of which may be presently being executed (e.g., running) or scheduled to be executed. A given action can depend on one or more other actions being performed or scheduled to be performed, where the given action will not be executed (e.g., run) until the one or more other actions are done executing. Accordingly, a given action can be executed after all its dependencies to other actions, if any, have completed execution. Depending on the embodiment, a given action in the set of actions can return a data result (e.g., as JavaScript Object Notation (JSON) data) or one or more actions (e.g., spawn one or more actions). Where a given action depends on another action, the given action can access the data results of the other action. For some embodiments, the executor 242 comprises a data mapper that holds data results (e.g., return values) of actions and maps parent actions to data storage location holding the results of a child action from which the parent action depends.

In order to facilitate an API call to an external software service (e.g., one of the external software services 208) based on execution of one or more actions, the executor 242 executer 242 may first establish access (e.g., API access) to the external software service, which can be established based on a data connection setting of a particular data connection associated with the one or more actions (which as noted herein may have been generated by the parser 240 based on a reference to the particular data connection in the logic of an operation). Depending on the embodiment, the executor 242 can use the authentication manager 246 to establish the access to an external software service. For instance, the executor 242 can either rely on the authentication manager 246 to establish authenticated access to the external software service on behalf of the executor 242, or request that the authentication manager 246 provide authentication information (e.g., stored authentication information) associated with the particular data connection to the executor 242, thereby enabling the executor 242 to establish access to the external software service. As described herein, the authentication information can comprise authentication information previously obtained by the authentication manager 246 (e.g., an authorization token obtained via OAUTH), stored by the software component relational system 200, and associated with the particular data connection (e.g., via a data connection setting).

The operation scheduler 244 can facilitate or support management of execution schedules with respect to operations of a software component environment, which can include adding (e.g., associating or creating), configuring, and removing (e.g., disassociating or deleting) a schedule with respect to a particular operation of the software component environment. For some embodiments, the operation scheduler 244 can schedule of future execution of a particular operation of the software component environment, where the execution of the particular operation occurs without the involvement of a client request (e.g., via an endpoint). For instance, the operation scheduler 244 can cause periodic (e.g., daily, weekly, monthly, etc., at a certain time of day) execution of the particular operation based on a schedule, or cause a one-time future execution of the particular operation based on a schedule. The particular operation can be associated with a plurality of schedules. Additionally, a given schedule associated with the particular operation can include information used in execution of the particular operation at the scheduled time, such as a set of parameters passed to the particular operation at the time of execution, or where a data result provided by the particular operation can be stored or sent (e.g., transmitted).

The authentication manager 246 can facilitate or support management of authentication of the software component relational system 200 (or elements thereof) with respect to a set of external software services (e.g., one or more of the external software services 208), which can facilitate access to those external software services for making API calls (e.g., API calls to the external software services by the executor 242 in accordance with actions generated by the parser 240). For instance, as described herein, the authentication manager 246 can facilitate authenticated access of a particular external software service (e.g., one of the external software services 208) by the executor 242 such that the executor 242 can perform one or more API calls with respect to the particular external software service. More regarding the authentication manager 246 is described with respect to FIG. 3.

Figure 3:
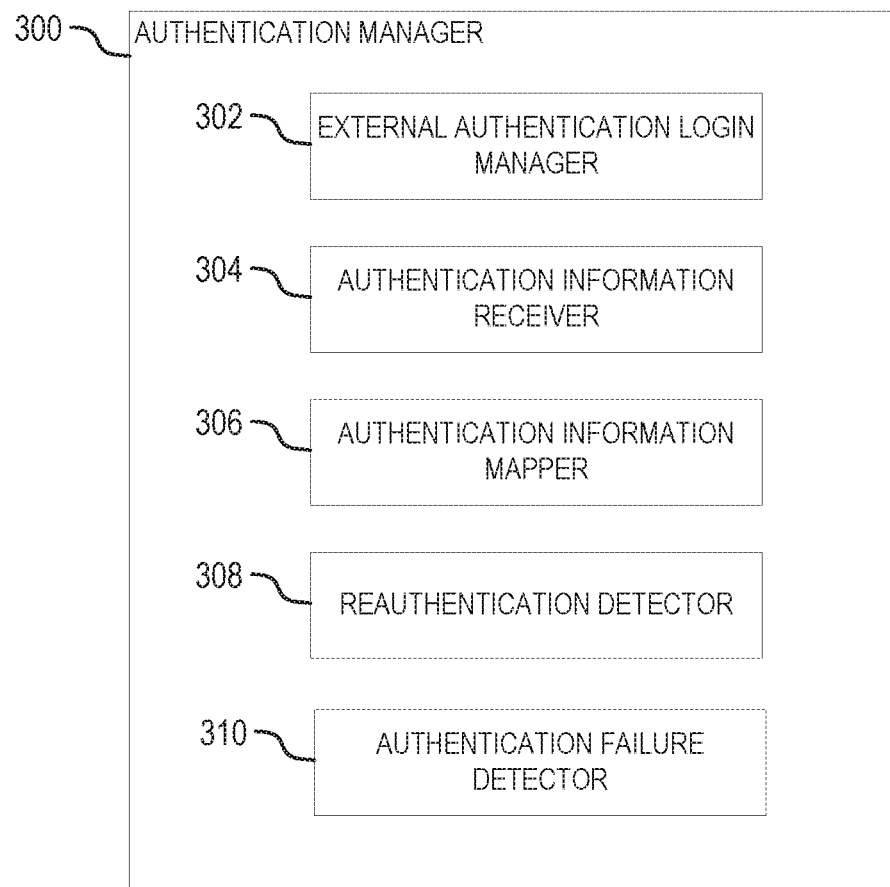
FIG. 3 is a block diagram illustrating an example authentication manager, according to some embodiments.

FIG. 3 is a block diagram illustrating an example authentication manager 300, according to some embodiments. For some embodiments, the authentication manager 300 implements at least some part of the authentication manager 246 of the software component relational system 200 described above with respect to FIG. 2. As noted herein, authentication by the authentication manager 300 can enable a software component relational system described herein (e.g., 200) to establish access to an external software service (e.g., one of the external software services 208 of FIG. 2). As shown, the authentication manager 300 comprises an external authentication login manager 302, an authentication information receiver 304, an authentication information mapper 306, a reauthentication detector 308, and an authentication failure detector 310. For various embodiments, the components and arrangement of components shown may vary from what is illustrated in FIG. 3. For instance, the authentication manager 300 can include more or fewer components than the components shown in the FIG. 3.

The external authentication login manager 302 can facilitate or support management of third-party authentication processes, which can include hosting a user login prompt (e.g., user login web page), or causing such a user login prompt to appear on a client device (e.g., through a client software application), thereby facilitating acquisition of credentials of a user account for authentication (e.g., authentication with services such as Google®, Facebook®, or Amazon®), which can enable access to an external software service (e.g., one of the external software services 208 of FIG. 2). Depending on the embodiment, the external authentication login manager 302 can facilitate user login by a particular end user (e.g., consumer) at a client software application that is using one or more composed components (e.g., operations) of a software component environment. In doing so, the external authentication login manager 302 can enable end user-provided authentication for a composed component (e.g., an operation) of a software component environment, which can permit the composed component to access (via an end user-authenticated data connection) data of an external software service (e.g., Slack®) associated with the particular end user. An end user-authenticated data connection can comprise a data connection that is configured (via associated data connection setting information) to establish access to an external software service using authentication based on user account credentials provided by an end user of a client software application.

Additionally, the external authentication login manager 302 can facilitate user login by using credentials of a user account associated with a software development entity, such as an individual software developer who creates/manages (e.g., "owns") the software component environment and who also could be the developer of the client software application that uses one or more composed components of the software component environment. In doing so, the external authentication login manager 302 can enable developer-provided authentication for a composed component (e.g., an operation) of a software component environment, which can permit the composed component to access (via a develop-authenticated data connection) data of an external software service to be used by a client software application for a plurality of users (e.g., all end users or only development users) of the client software application. A developer-authenticated data connection can comprise a data connection that is configured (via associated data connection setting information) to establish access to an external software service using authentication based on user account credentials provided by a software development entity. Through the authentication manager 300, a software development entity can maintain and use a plurality of different user accounts for authenticating different types of access to a particular external software service, such as access to different data (e.g., different data tables) or different levels of access (e.g., read only access versus read/write access). For instance, a software development entity can have a user account associated with development stage access and another user account associated with production stage access. Accordingly, in connection with a particular software component environment, the external authentication login manager 302 can enable a software development entity to authenticate both a development user account and a production user account with respect to an external software service, but associate resulting authentication information (resulting from each of the two authentications) to two different data connections to the same external software service. A version of an operation meant for development can reference the data connection associated with the development user account, and another version of the same operation meant for production use can reference the data connection associated with the production user account.

Based on a user successfully completing a third-party authentication process, the third-party authentication process can provide the authentication manager 300 with authentication information, such as an authentication token or key (e.g., one obtained via a OAUTH flow), which the authentication information receiver 304 can receive and store for future authentication use. For some embodiments, based on the stored authentication information (e.g., stored authentication token), the external authentication login manager 302 facilitates authenticated access with respect to an external software service without having to perform the third-party authentication process (e.g., using user login prompt) over again. For some embodiments, once received and stored, the authentication information receiver 304 can associate the stored authentication information with a particular software component environment, thereby permitting a user (e.g., a software development entity) to associate the stored authentication information with a particular data connection associated with the particular software component environment (e.g., via data connection setting information).

The authentication information mapper 306 can maintain (e.g., within a list of user records) mappings between user accounts and their respective stored authentication information. As described herein, stored authentication information can include a stored authentication token obtained based on OAUTH flow using user account credentials of a particular user (e.g., end user or software development entity). The user accounts can be third-party user accounts used to obtain the stored authentication information (e.g., third-party user accounts, such as a Google® user account), or native user accounts associated with (e.g., maintained by) a platform provided by an embodiment described herein. As described herein, stored end user-provided authentication information (for a particular end user) can be used in establishing access to data of an external software service associated with the particular end user, where the access is by way of a data connection to the external software service configured to use end user-provided authentication. To identify an end user and map the identified end user to their respective stored end user-provided authentication information, the authentication information mapper 306 can request the end user to identify themselves by way of their third-party user account identifier (e.g., third-party username) or their native user account identifier (e.g., platform user account). Initially, where a data connection to an external software service is configured to use stored end user-provided authentication information and such information has yet to be obtained with respect to the external software service, the external authentication login manager 302 can cause the end user to be prompted with a user login prompt (e.g., user login webpage) to facilitate the initial authentication process and obtain end-user provided authentication information. Once end user-provided authentication information is stored, the authentication information mapper 306 can map the end user to the stored end user-provided authentication information and obviate the need for the end user to be prompted for a user login again. In this way, various embodiments facilitate application-level user login (e.g., front-end login by native user account) that can map a given user account (e.g., front-end user account credentials) to stored end user-provided stored authorization information for one or more third-party user accounts, which in turn can establish access to a set of external software services for one or more API calls.

The reauthentication detector 308 can detect whether stored authentication information (e.g., associated with an end user or a software development entity) is invalid or expired (e.g., expired authentication token). For some embodiments, the reauthentication detector 308 can handle reauthenticating or refreshing stored authentication information (e.g., refresh a stored authentication token) in response to detecting that the stored authentication information is invalid or expired. For instance, where the stored authentication information comprises an invalid/expired authentication token, the reauthentication detector 308 can use a refresh token process provided by OAUTH to refresh an expired authentication token.

The authentication failure detector 310 can detect whether authentication with respect to an external software service has failed. For some embodiments, the authentication failure detector 310 can attempt to retry authentication in response to detecting that authentication has failed. The detection of the failure and reauthentication process can be automatically handled by the authentication manager 300, without the client software application being aware that a failure has occurred.

Figure 4:
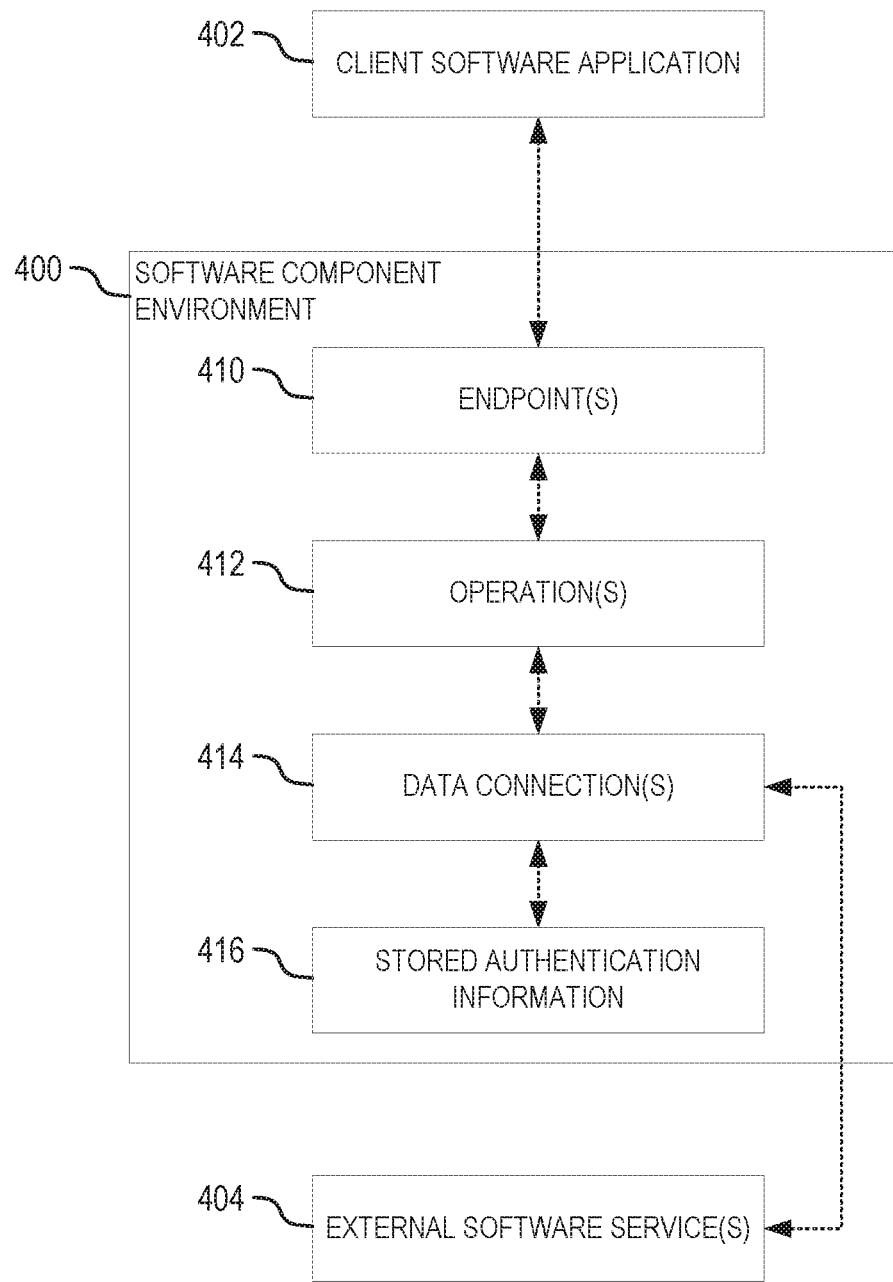
FIG. 4 is a block diagram illustrating the logical construction of an example software component environment, according to some embodiments.

FIG. 4 is a block diagram illustrating the logical construction of an example software component environment 400, according to some embodiments. As shown, the software component environment 400 comprises (or is associated with) a set of endpoints 410, a set of operations 412, a set of data connections 414 to one or more external software service(s) 404, and stored authentication information 416. For some embodiments, a client software application 402 access one or more of the operations 412 via their associated endpoints 410. Based on its particular logic, a given operation of the operations 412 can access (e.g., make API calls with respect to) one of the external software services 404 by referencing one of the data connectionsconnections 414 and, more specifically, calling a data connector operation with respect to one of the data connectionsconnections 414. The stored authentication information 416 can be used to establish access to one of the external software services 404 through one of the data connections 414, which then facilitates APT calls to the external software service.

FIGS. 5-9 are flowcharts illustrating example methods for software component environments, according to some embodiments. It will be understood that example methods described herein may be performed by a machine in accordance with some embodiments. For example, any one of the methods 500, 600, 700, 800, 900 may be performed by the software component relational system 200. An operation of various methods described herein may be performed by a hardware processor (e.g., a central processing unit or graphics processing unit) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of a method 500 of FIG. 5 may be represented by executable instructions that, when executed by a processor of a computing device, cause the computing device to perform the method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 5:
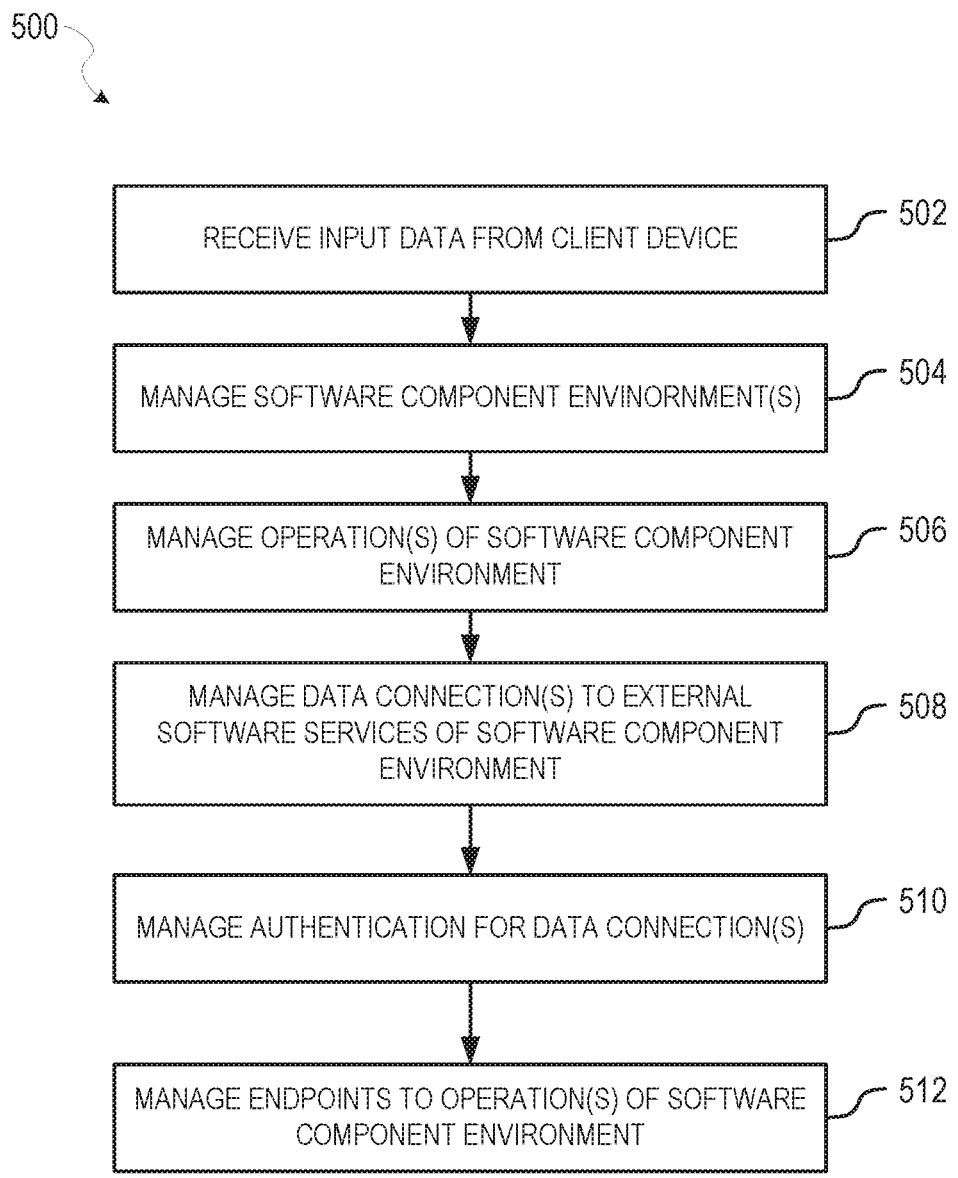
FIGS. 5-9 are flowcharts illustrating example methods for software component environments, according to some embodiments.

Referring now to the FIG. 5, the method 500 generally relates to management of software component environments, where the method 500 may be performed by the software component relational system 200. As shown, the method 500 begins with operation 502 receiving (e.g., at the software component relational system 200) input data from a client device. Depending on the embodiment, the input data can comprise: file data; data corresponding to one or more requests, commands, instructions, or user inputs made through a graphic user interface (GUI) by a user; or some combination thereof. For instance, the file data can comprise files relating to a software component environment that are uploaded from a client device to the software component relational system 200, such as an operation source code file, a data connection configuration file, or a file comprising authentication information (e.g., private or public key). The GUI facilitating the data corresponding to request/commands/user inputs can comprise a native user interface of a software application or a web-based user interface provided over a network connection. For some embodiments, the GUI operates as a management console with respect to the software component relational system 200, where a user (e.g., end user or software development entity) can access management functionality with respect to the software component relational system 200. Operations 504 through 512 represent some of the functions that the user can invoke or interact with through the GUI. Alternatively, for some embodiments, one or more requests, commands, instructions, or user inputs with respect to the software component relational system 200 can be facilitated through a command-line interface (CLI), such as a Linux or UNIX shell, that can interface with the software component relational system 200 (e.g., through a command entered through the command-line).

The method 500 continues with operation 504 managing a set of software component environments on a software component relational system (e.g., 200). Operation 504 can be performed based on (e.g., in response to) the input data received at operation 502. Managing a set of software component environments can include, without limitation creating, configuring, and deleting a particular software component environment on the software component relational system 200. For some embodiments, at least some portion of operation 504 is performed by the software component environment manager 232 of the software component relational system 200.

The method 500 continues with operation 506 managing a set of operations of a particular software component environment. Operation 506 can be performed based on (e.g., in response to) the input data received at operation 502. Managing a set of operations can include, without limitation, adding (e.g., associating or creating), configuring (e.g., adding or modifying logic), scheduling, and removing (e.g., disassociating or deleting) a particular operation of the particular software component environment. For some embodiments, at least some portion of operation 506 is performed by the operation manager 234 of the software component relational system 200.

The method 500 continues with operation 508 managing a set of data connections of the particular software component environment, where the data connections are to a set of external software services (e.g., one of the external software services 208). Operation 508 can be performed based on (e.g., in response to) the input data received at operation 502. Managing a set of operations can include, without limitation, adding (e.g., associating or creating), configuring, and removing (e.g., disassociating or deleting) an available (e.g., pre-built) data connection with respect to the particular software component environment. For some embodiments, at least some portion of operation 508 is performed by the data connection manager 236 of the software component relational system 200.

The method 500 continues with operation 510 managing authentication for the set of data connections of the particular software component environment based on the input data received at operation 502. Operation 510 can be performed based on (e.g., in response to) the input data received at operation 502. Managing a set of operations can include, without limitation, causing a user login prompt to appear to collect credentials of a user account from a user (e.g., an end user or a software development entity), receiving authentication information (e.g., authentication token) based on authentication of those credentials, and storing the authentication information for subsequent access to an external software service. For some embodiments, at least some portion of operation 510 is performed by the authentication manager 246 of the software component relational system 200.

The method 500 continues with operation 512 managing a set of endpoints for the set of operations of the particular software component environment based on the input data received at operation 502. Operation 512 can be performed based on (e.g., in response to) the input data received at operation 502. Managing a set of endpoints can include, without limitation, adding (e.g., associating or creating), configuring, and removing disassociating or deleting) an endpoint of an operation with respect to the particular software component environment. For some embodiments, at least some portion of operation 512 is performed by the operation endpoint manager 238 of the software component relational system 200.

Figure 6:
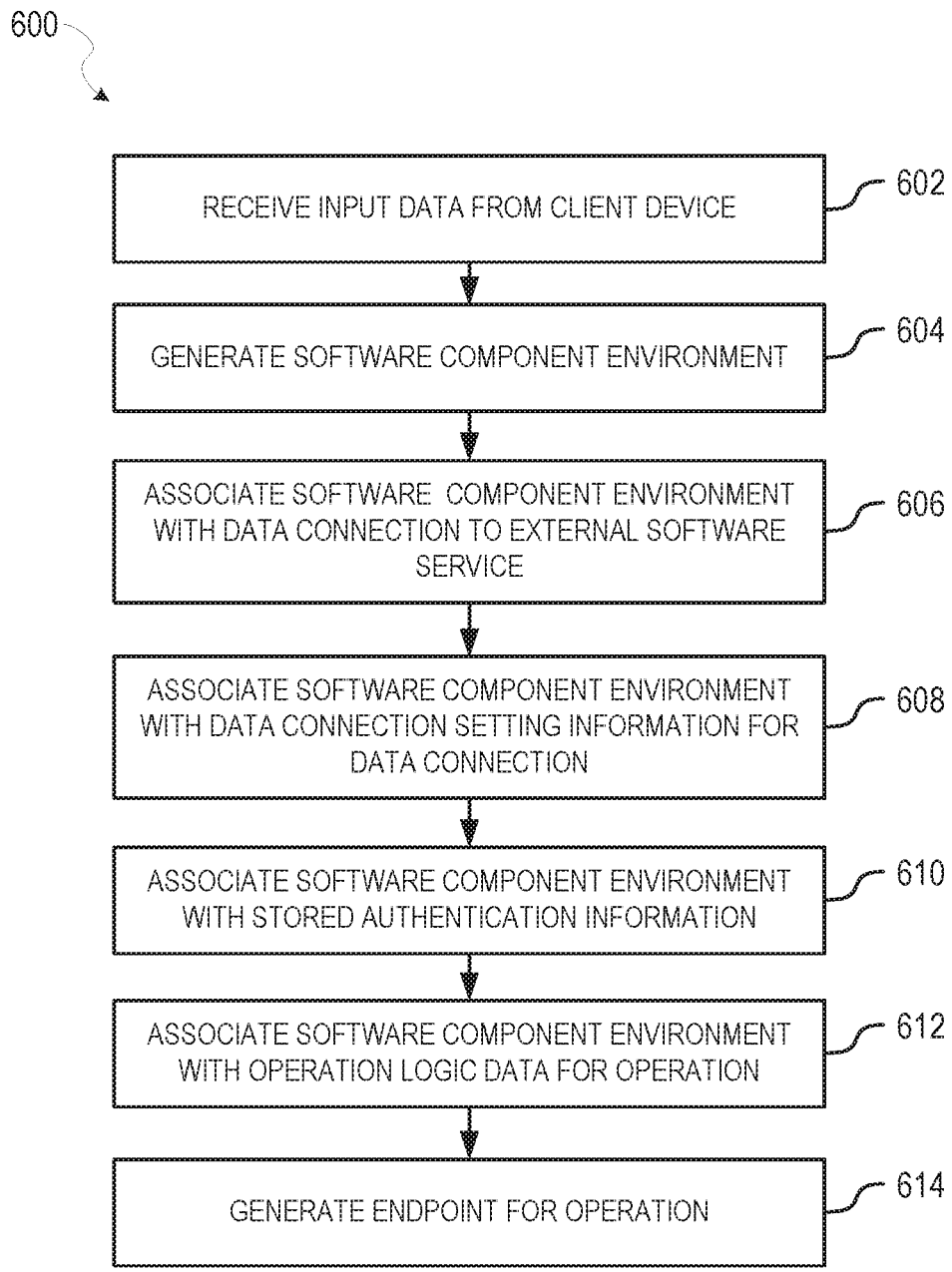

Referring now to the FIG. 6, the method 600 relates to generation (e.g., creation) and configuration of a software component environment, where the method 600 may be performed by the software component relational system 200. As shown, the method 600 begins with operation 602 receiving (e.g., at the software component relational system 200) input data from a client device. For some embodiments, operation 602 is similar to operation 502 described above with respect to the method 500 of FIG. 5.

The method 600 continues with operation 604 generating a software component environment on a software component relational system (e.g., 200). Operation 604 can be performed based on (e.g., in response to) the input data received at operation 602. For instance, through the input data, a user at a client device can instruct that a software component environment be created. Additionally, for some embodiments, at least some portion of operation 604 is performed by the software component environment manager 232 of the software component relational system 200.

The method 600 continues with operation 606 associating the software component environment generated at operation 604 with a data connection to an external software service (e.g., one of the external software services 208). Operation 606 can be performed based on (e.g., in response to) the input data received at operation 602. For instance, through the input data, a user at a client device can instruct that a data connection be added to the software component environment. As described herein, the data connection can be one that is custom developed by a user (e.g., software development entity) or one that is selected from a plurality of pre-built data connections available on the software component relational system (e.g., 200). The plurality of pre-built data connections can be stored in a repository of the software component relational system, and presented to a user as a searchable list of data connections. For some embodiments, at least some portion of operation 606 is performed by the data connection manager 236 of the software component relational system 200.

The method 600 continues with operation 608 associating the software component environment generated at operation 604 with data connection setting information for the data connection associated with the software component environment at operation 606. Operation 608 can be performed based on (e.g., in response to) the input data received at operation 602. For instance, through the input data, a user at a client device can instruct that a data connection setting for the data connection be added to or modified with respect to the software component environment. For some embodiments, at least some portion of operation 608 is performed by the data connection manager 236 of the software component relational system 200.

The method 600 continues with operation 610 associating the software component environment generated at operation 604 with stored authentication information, which may be provided by an authentication manager (e.g., 246 or 300). Operation 610 can be performed based on (e.g., in response to) the input data received at operation 602. For instance, through the input data, a user at a client device can instruct that authentication information (e.g., authentication token) be added to the software component environment. As described herein, the stored authentication information can comprise an authentication token or key obtained by the authentication manager by authenticating credentials of a user account as described herein. For some embodiments, at least some portion of operation 610 is performed by the authentication manager 246 of the software component relational system 200 or by the authentication manager 300.

The method 600 continues with operation 612 associating operation logic data (e.g., source code) for an operation with the software component environment. For some embodiments, the operation logic data describes logic for the operation, where the logic translates to a set of actions to be performed with respect to the external software service, via the data connection (associated with the software component environment at operation 606), when the operation is executed on the software component relational system (e.g., 200). As noted herein, the set of actions can be selected from a unified set of actions (e.g., supported by an interface abstraction layer of an executor), and each action of the unified set of actions can be mapped to an application program interface specification (e.g., OpenAPI, WSDL, OData, etc.), which results in generation of one or more application program interface calls defined by the application program interface specification. Operation 612 can be performed based on (e.g., in response to) the input data received at operation 602. For instance, through the input data, a user at a client device can instruct that logic (e.g., source code) be added to or modified with respect to the operation of the software component environment. As described herein, the set of actions can be generated by parsing the logic (e.g., source code) of the operation. Additionally, the set of actions to be performed with respect to the external software service can cause one or more API calls (e.g., third-party API calls related to the external software service) to the external software service, where the API calls convey the intent of the operation logic with respect to the external software service. For some embodiments, at least some portion of operation 612 is performed by the operation manager 234 of the software component relational system 200.

The method 600 continues with operation 614 generating an endpoint for invoking execution of the operation (for which operation logic data is associated with the software component environment by operation 612), the endpoint being associated with the software component environment. Operation 614 can be performed based on (e.g., in response to) the input data received at operation 602. For instance, through the input data, a user at a client device can instruct that an endpoint be created for the operation of the software component environment. For some embodiments, generating an endpoint with respect to the operation deploys the operation for usage by a computing resource (e.g., client software application) external to the software component relational system (e.g., 200). Depending on the embodiment, the endpoint generated can comprise an HTTP endpoint, a webhook, or an API call (e.g., from source code of a client software application). For some embodiments, at least some portion of operation 614 is performed by the operation endpoint manager 238 of the software component relational system 200.

Figure 7:
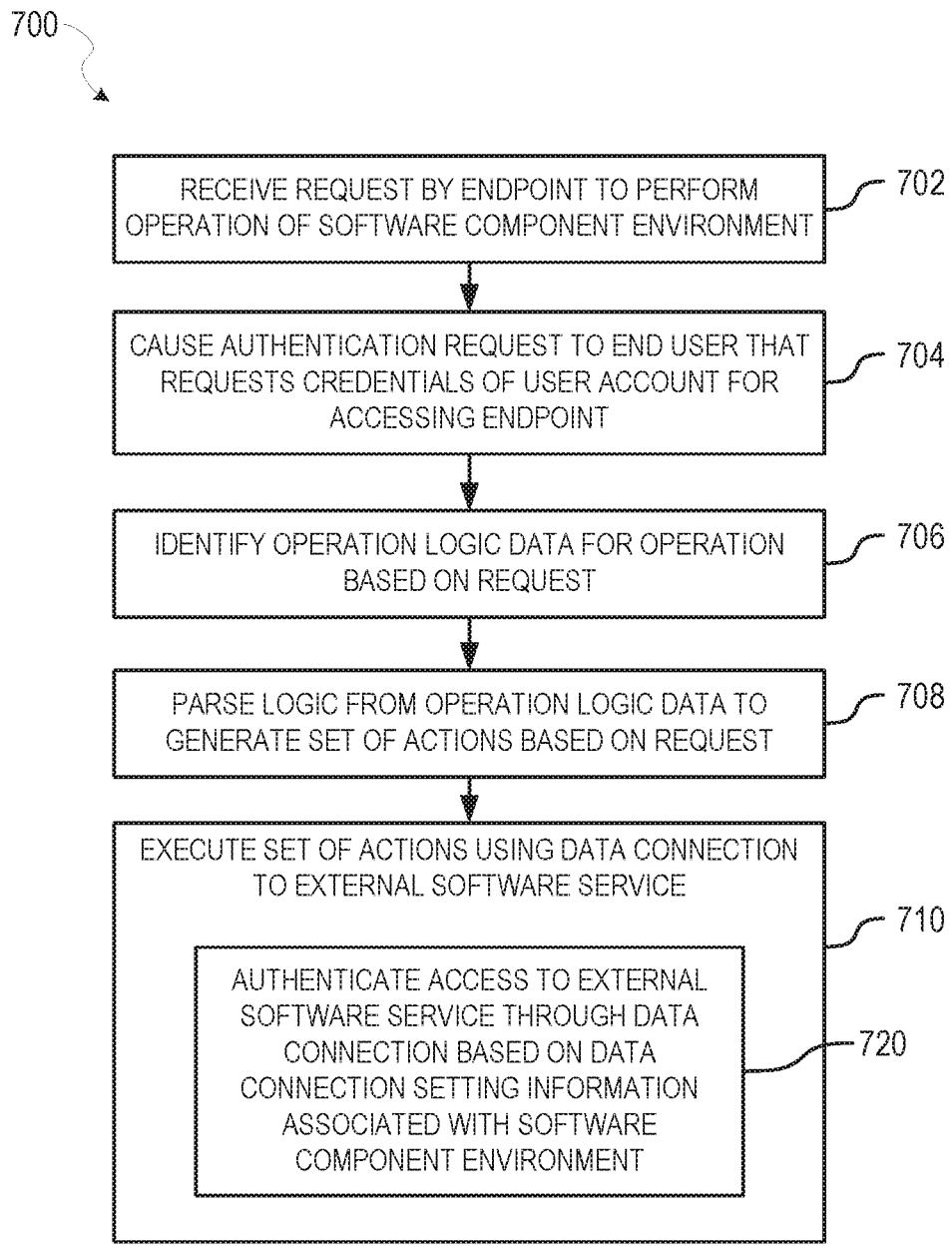
Figure 8:
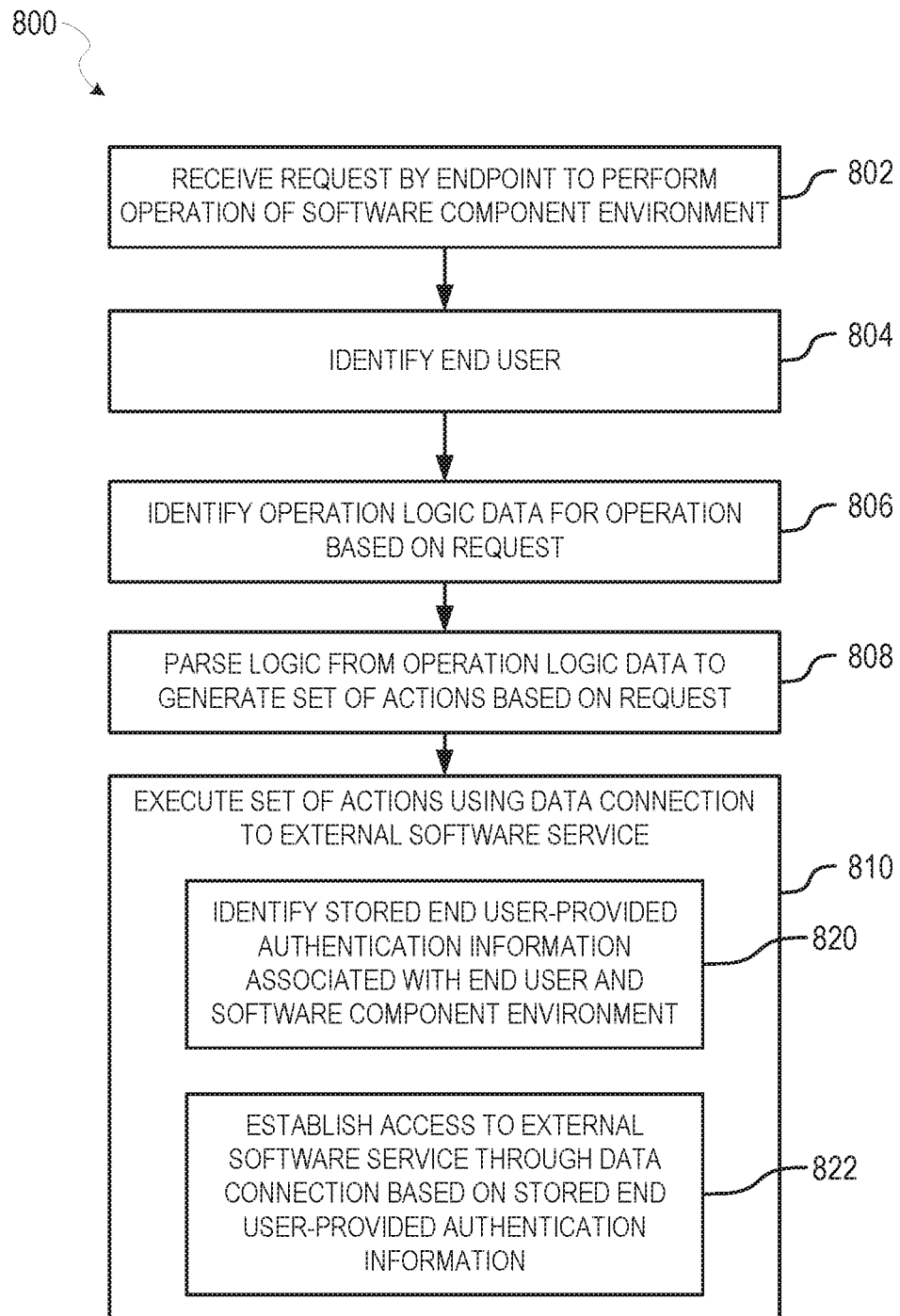

With respect to FIGS. 7 and 8, the methods 700 and 800 relate to processing requests to perform an operation of a software component environment, where each of the methods 700 and 800 may be performed by the software component relational system 200.

Referring now to the FIG. 7, the method 700 begins with operation 702 receiving, by an endpoint associated with an operation of a software component environment, a request from a client software application to perform (e.g., invoke or schedule execution of) the operation. To perform the operation, the method 700 continues to operations 704 through 710. The request can comprise payload data, such as one or more parameters or variables values to be passed to the operation through the endpoint. For some embodiments, at least some portion of operation 702 is performed by the gateway 230 of the software component relational system 200.

The method 700 continues with operation 704 causing an authentication request to be sent to an end user of the client software application, where the authentication request requests, from the end user, credentials of a user account for accessing the endpoint of operation 702. The authentication request can be sent to the end user based on a configuration or setting of the endpoint, which can specify that the end user must sign-in to access the endpoint. Alternatively, the endpoint can be configured to be publicly accessible (e.g., open to all users) and may be configured/set not to require an end user sign-in. For some embodiments, at least some portion of operation 704 is performed by the authentication manager 246 of the software component relational system 200 or the authentication manager 300.

The method 700 continues with operation 706 identifying, based on the request of operation 702, operation logic data for the operation that is associated with the software component environment. For some embodiments, at least some portion of operation 706 is performed by the gateway 230 of the software component relational system 200.

The method 700 continues with operation 708 parsing the logic, from the operation logic data identified by operation 706, to generate a specific set of actions based on the request of operation 702. For some embodiments, at least some portion of operation 708 is performed by the parser 240 of the software component relational system 200.

The method 700 continues with operation 710 executing the specific set of actions (generated by operation 708) using a data connection (of the software component environment) to the external software service. As shown, operation 710 is performed by operation 720 authenticating access to the external software service through the data connection based on data connection setting information associated with the software component environment. Authenticating access can comprise establishing, based on the data connection setting information, access to the external software service through the data connection using stored authentication information. For some embodiments, the data connection setting information configures the data connection to use stored authentication information, associated with the software component environment, in establishing access to the external software service through the data connection. Additionally, for some embodiments, the data connection setting information configures the data connection to request, during operation execution, an end user at the client software application to provide credentials of an external user account to establish access to the external software service through the data connection. The stored authentication information can comprise an authentication token (e.g., obtained) from the external software service. For some embodiments, at least some portion of operation 710 is performed by the executor 242 of the software component relational system 200.

Referring now to the FIG. 8, the method 800 begins with operation 802, which, according to various embodiments, is similar to operation 702. The method 800 continues with operation 804 identifying an end user at the client software application. Operation 804 can be performed in response to receiving the request at operation 802. Depending on the embodiment, the end user can be identified based on the end user logging into the software component relational system 200 using credentials of a user account associated with (e.g. native to) the software component relational system 200. For some embodiments, at least some portion of operation 804 is performed by the gateway 230 of the software component relational system 200.

The method 800 continues with operation 806, which, according to various embodiments, is similar to operation 706. The method 800 then continues with operation 808, which, according to various embodiments, is similar to operation 708.

The method 800 continues with operation 810 executing the specific set of actions (generated by operation 808) using a data connection (of the software component environment) to the external software service. As shown, operation 810 begins with operation 820 identifying stored end user-provided authentication information associated with the end user and associated with the software component environment. For some embodiments, the stored end user-provided authentication information associated with the end user is identified based on a mapping maintained by the authentication manager 300 (e.g., the authentication information mapper 306). Operation 810 continues with operation 822 establishing access to the external software service through the data connection based on the stored end user-provided authentication information. For some embodiments, at least some portion of operation 822 is performed by the executor 242 of the software component relational system 200.

Figure 9:
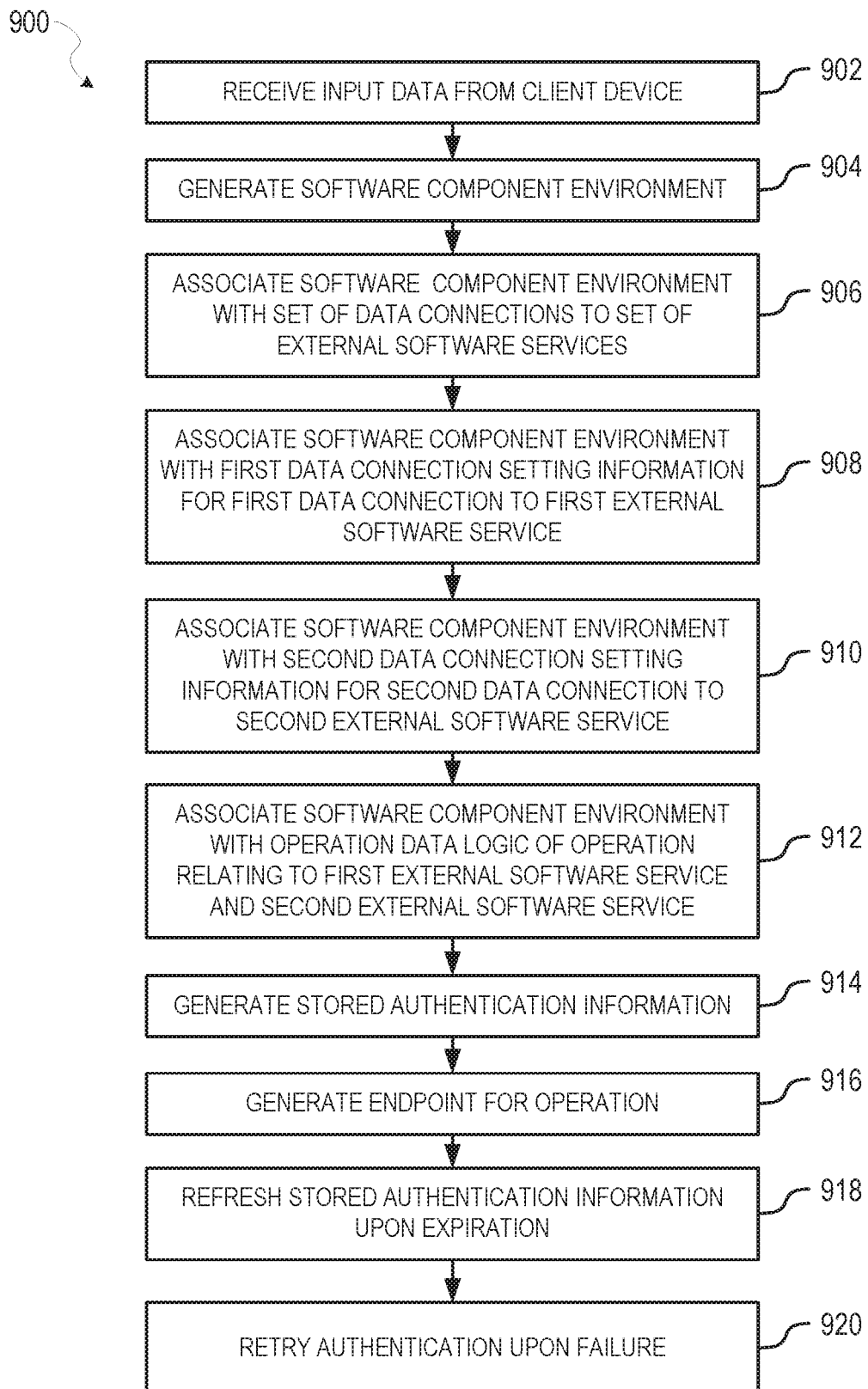

Referring now to the FIG. 9, the method 900 relates managed authentication with respect to a software component environment, which may be performed by the software component relational system 200. As shown, the method 900 begins with operations 902 and 904, which according to some embodiments, are respectively similar to operations 602 and 604 described above with respect to the method 600 of FIG. 6.

The method 900 continues with operation 906 associating the software component environment with a set of data connections to a set of external software services, where the set of external software services is available for use by an operation associated with the software component environment. Operation 906 can be performed based on (e.g., in response to) the input data received at operation 902. For some embodiments, at least some portion of operation 906 is performed by the data connection manager 236 of the software component relational system 200.

The method 900 continues with operation 908 associating the software component environment with first data connection setting information for a first data connection in the set of data connections, where the first data connection setting information specifies use of first stored authentication information (associated with the software component environment, such as developer-provided stored authentication information) to establish access to a first external software service through the first data connection. Operation 908 can be performed based on (e.g., in response to) the input data received at operation 902. For some embodiments, at least some portion of operation 908 is performed by the data connection manager 236 of the software component relational system 200.

The method 900 continues with operation 910 associating the software component environment with second data connection setting information for a second data connection in the set of data connections. Operation 910 can be performed based on (e.g., in response to) the input data received at operation 902. The second data connection setting information can specify use of second stored authentication information (associated with the software component environment, such as end user-provided stored authentication information) to establish access to the second external software service through the second data connection. For some embodiments, at least some portion of operation 910 is performed by the data connection manager 236 of the software component relational system 200.

The method 900 continues with operation 912 associating operation logic data with the software component environment. For some embodiments, the operation logic data describes logic for the operation, where the logic translates to a set of actions to be performed with respect to at least one of the first external software service, via the first data connection (associated with the software component environment at operation 908), or the second external software service, via a second data connection (associated with the software component environment at operation 908), when the operation is executed. As noted herein, the set of actions can be selected from a unified set of actions (e.g., supported by an interface abstraction layer of an executor), and each action of the unified set of actions can be mapped to an application program interface specification (e.g., OpenAPI, WSDL, OData, etc.), which results in one or more application program interface calls defined by the application program interface specification. Operation 912 can be performed based on (e.g., in response to) the input data received at operation 902. For some embodiments, at least some portion of operation 912 is performed by the operation manager 234 of the software component relational system 200.

The method 900 continues with operation 914 generating the (first or second) stored authentication information. Operation 914 can be performed based on (e.g., in response to) the input data received at operation 902. For some embodiments, generating the first stored authentication information comprises: authenticating with the first external software service based on credentials of an external user provided by an administrative user at the first client device; receiving an authentication token from the first external software service upon successful authentication based on the credentials of the external user account; and storing the authentication token as first stored authentication information. Authenticating with the first external software service, based on credentials of an external user account provided by an administrative user at the first client device, can comprise causing a sign-in page associated with the external user account to appear on first second client device.

For some embodiments, at least some portion of operation 914 is performed by the authentication manager 300 (e.g., the external authentication login manager 302 and the authentication information receiver 304).

The method 900 continues with operation 916, which, according to some embodiments, is similar to operation 614 described above with respect to the method 600 of FIG. 6.

The method 900 continues with operation 918 refreshing (first or second) stored authentication information upon detecting expiration of the stored authentication information. For some embodiments, operation 918 comprises: determining whether first stored authentication information has expired; and in response to determining that the first stored authentication information has expired, refreshing the first stored authentication information with the first external software service. For some embodiments, at least some portion of operation 918 is performed by the authentication manager 300 (e.g., the reauthentication detector 308).

The method 900 continues with operation 920 retrying authentication with the external software service upon detecting failure of authentication. For some embodiments, operation 920 comprises: determining whether authentication based on first stored authentication information has failed when attempting to establish access to a first external software service through a first data connection; and in response to determining that authentication based on the first stored authentication information has failed, retrying authentication based on the first stored authentication information. For some embodiments, at least some portion of operation 920 is performed by the authentication manager 300 (e.g., the authentication failure detector 310).

FIGS. 10-14 present screen shots of examples graphical user interfaces (GUIs) for a software component environment, according to some embodiments.

Figure 10:
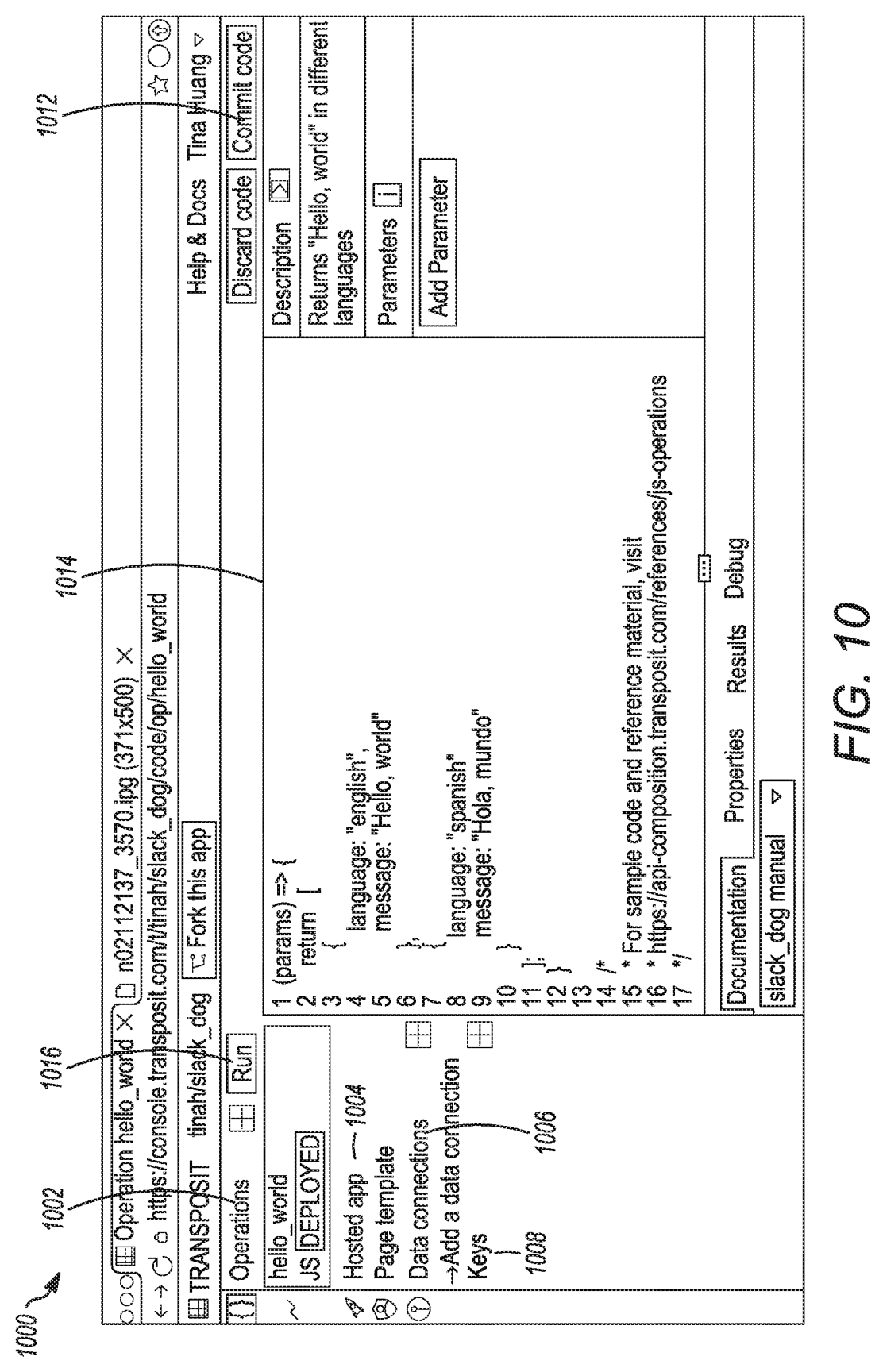

Referring now to FIG. 10, a screen shot 1000 illustrates an example management console GUI for a software component relational system (e.g., 200) described herein, particularly with respect to a software component environment named "slack_dog" associated with a user "tinah" on a software component relational system (e.g., 200), As shown, on the left side bar, the GUI comprises: a user interface 1002 for adding or associating an operation with respect to the software component environment and listing operations already added/associated with the software component environment; a user interface 1004 for adding or associating a hosted client software application with the software component environment and listing hosted applications already added/associated with the software component environment (where a hosted application can make use of operations of the software component environment); a user interface 1006 for adding or associating a data connection with respect to the software component environment and listing data connections already added/associated with the software component environment; and a user interface 1008 for adding or associating authentication information (e.g., an authentication token or key) with respect to the software component environment and listing authentication information already added/associated with the software component environment (where the authentication information can be used to establish access to an external software service via a data connection of the software component environment). The GUI also comprises a user interface 1014 that permits a user to view, add, or modify logic (e.g., JavaScript source code) of a selected operation ("hello_world") of the software component environment (selected from a listing in the left side of the GUI). When changes are made to the logic displayed in the user interface 1014, such changes to the selected operation can be committed to a version control/source control repository via a user interface 1012. Additionally, to test the logic displayed in the user interface 1014, a user can select user interface 1016 to run the logic and can view the results of the run by selecting user interface 1010.

Referring now to FIG. 11, a screen shot 1100 illustrates an example management console GUI for a software component relational system (e.g., 200) described herein. According to some embodiments, the illustrated GUI facilitates the addition of a data connection to a software component environment on a software component relational system (e.g., 200), Through the GUI, a user can search through data connections (e.g., pre-built or custom data connections) available for selection by the user. Once a user selects one of the available data connections, a user can provide the data connection to be added with an alias ("Name"), which can be used to uniquely identify the added data connection within the software component environment and that can be used to reference the added data connection within the logic (e.g., source code) of an operation of the software component environment. As described herein, the use of names/aliases permits multiple data connectors of a similar data connection type (e.g., data connector Google® Calendar) to be associated with different configuration or setting information. For instance, a first Google® Calendar data connector aliased "work calendar" can be associated with authentication information (e.g., based on credentials of a user account with a production environment) for accessing a user's work calendar, while a second Google® Calendar data connector aliased "personal calendar" can be associated with authentication information (e.g., based on credentials of a user account associated with an end user) for accessing a user's personal calendar.

Figure 12:
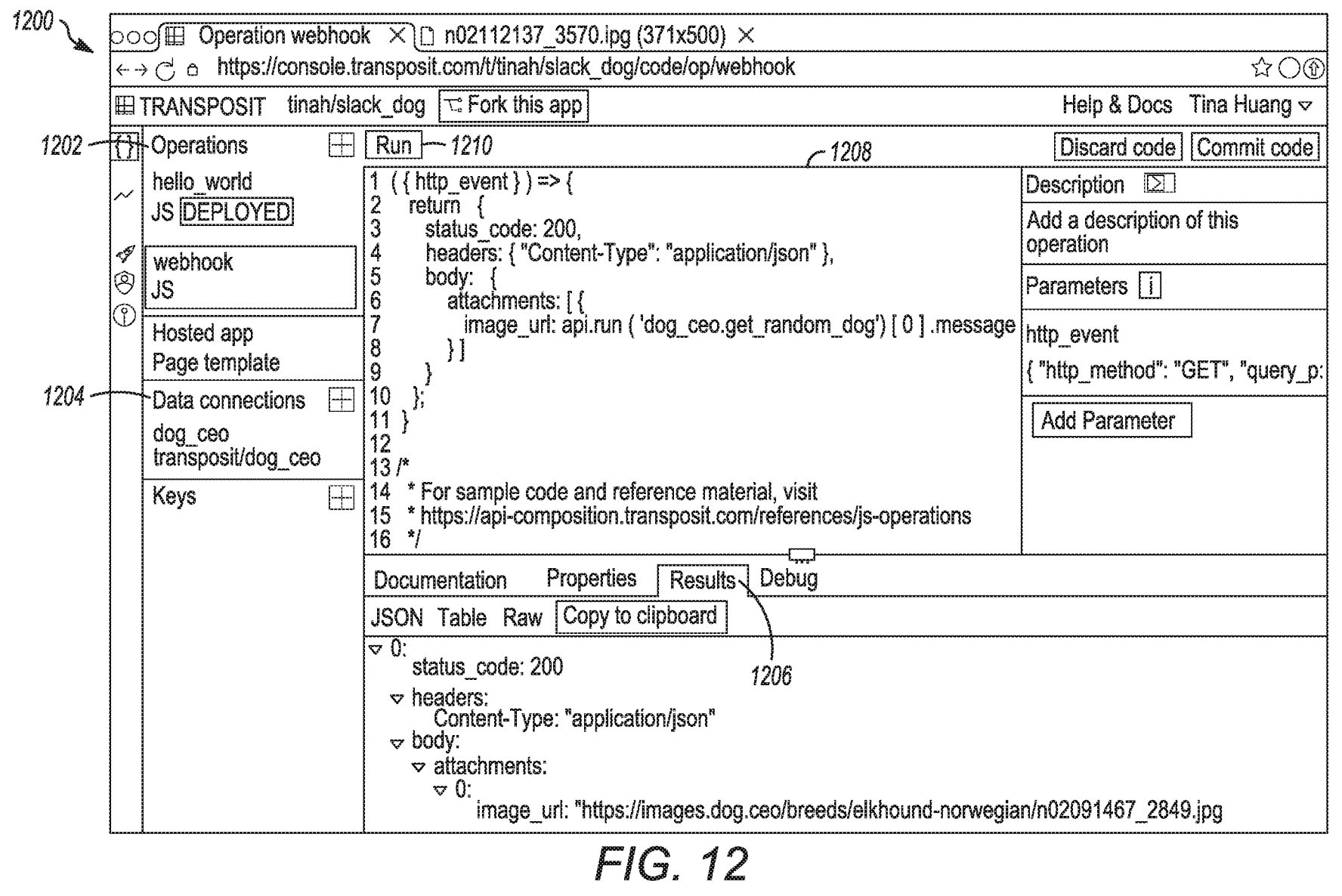

Referring now to FIG. 12, a screen shot 1200 illustrates an example management console GUI for a software component relational system (e.g., 200) described herein, particularly with respect to a software component environment named "slack_dog" associated with a user "tinah" on a software component relational system (e.g., 200). As shown, on the left side bar, the GUI comprises: a user interface 1202 for adding or associating an operation with respect to the software component environment and listing data operations already added/associated with the software component environment; and a user interface 1204 for adding or associating a data connection with respect to the software component environment and listing data connections already added/associated with the software component environment. The GUI also comprises a user interface 1208 that permits a user to view, add, or modify logic (e.g., JavaScript source code) of a selected operation ("webhook") of the software component environment (selected from a listing in the left side of the GUI). The select operation represents an operation that can be suitably associated with (e.g., deployed via) an endpoint comprising a webhook. The user interface 1204 indicates that a data connection named "dog_ceo" to an external software service "Dog CEO" is associated with the software component environment, and available for use in logic of an operation of the software component environment (as illustrated in the source code presented in the user interface 1208). As shown, the user tested the logic displayed in the user interface 1208 by selecting user interface 1210 to run the logic, and the results of the run are shown in user interface 1206.

Figure 13:
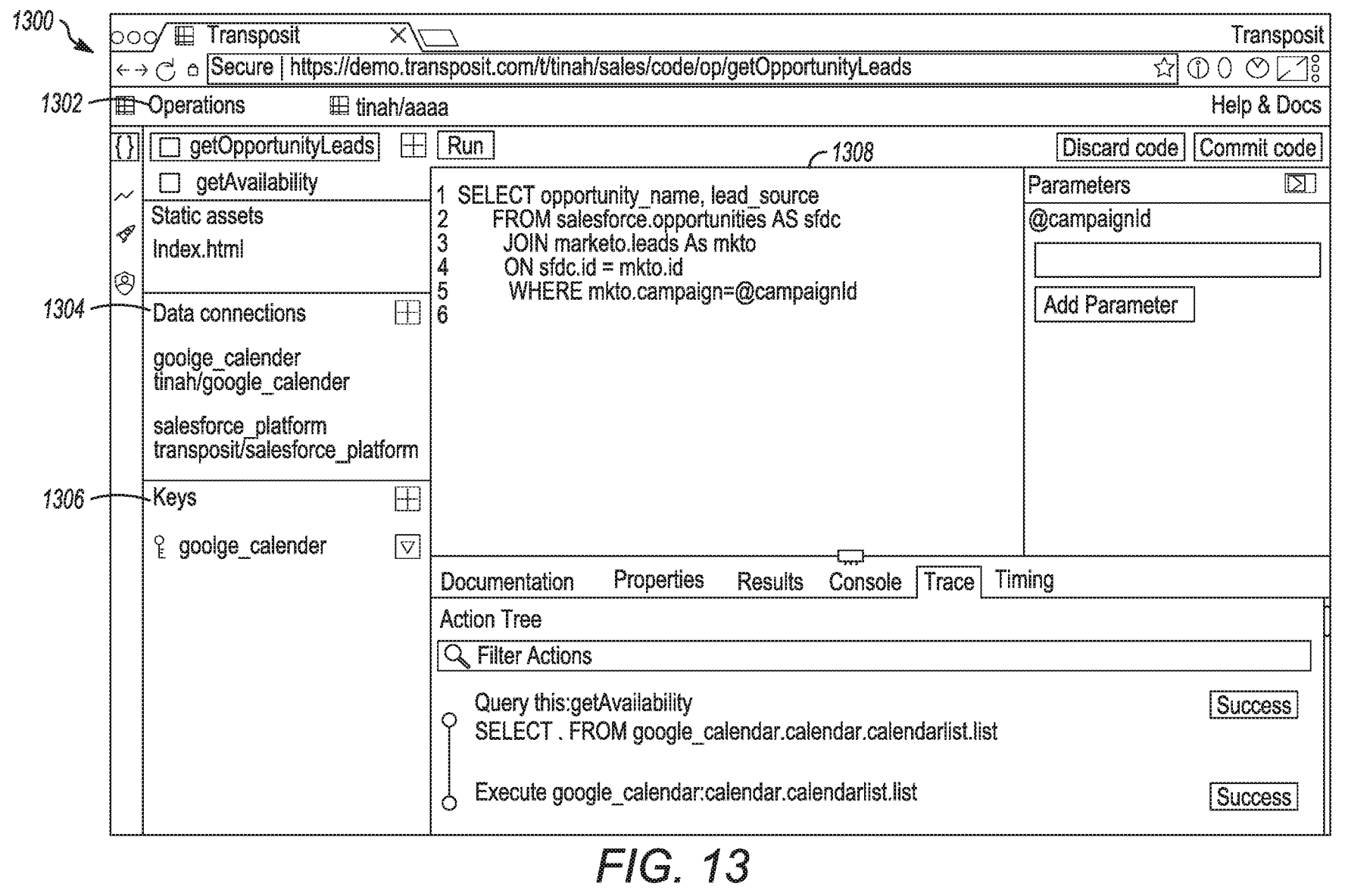

Referring now to FIG. 13, a screen shot 1300 illustrates an example management console GUI for a software component relational system (e.g., 200) described herein, particularly with respect to a software component environment named "sales" associated with a user "tinah" on a software component relational system (e.g., 200), As shown, on the left side bar, the GUI comprises: a user interface 1302 for adding or associating an operation with respect to the software component environment and listing data operations already added/associated with the software component environment; a user interface 1304 for adding or associating a data connection with respect to the software component environment and listing data connections already added/associated with the software component environment; and a user interface 1306 for adding or associating authentication information (e.g., authentication tokens or keys) with respect to the software component environment and listing authentication information already added/associated with the software component environment. The GUI also comprises a user interface 1308 that permits a user to view, add, or modify logic (e.g., JavaScript source code) of a selected operation ("getOpportunityLeads") of the software component environment (selected from a listing in the left side of the GUI). The user interface 1304 indicates that a data connection named "google_calendar" to an external software service "Google Calendar," and a data connection named "salesforce_platform" to an external software service "Salesforce Platform," are each associated with the software component environment, and available for use in logic of an operation of the software component environment. Additionally, the user interface 1306 indicates that an authentication token/key named "google_calendar" is available for use to authenticate access with respect to one or more data connections of the software component environment, such as the data connection "google_calendar" or the data connection "salesforce_platform."

Referring now to FIG. 14, a screen shot 1400 illustrates an example management console GUI for a software component relational system (e.g., 200) described herein, particularly with respect to a software component environment named "slack_dog" associated with a user "tinah" on a software component relational system (e.g., 200). As shown, on the left side bar, the GUI comprises: a user interface 1402 for accessing management of endpoints with respect to operations the software component environment; a user interface 1404 for accessing management of API keys that are used with one or more endpoints (e.g., required by requesters to access endpoints); and a user interface 1406 for accessing management of schedule tasks, which can be used to schedule execution of one or more operations of the software component environment. As shown, upon selection of the user interface 1402 (for management of endpoints), the GUI presents a user interface 1408 with operations of the software component environment ("hello_world" and "webhook") that are available for deployment via an end point. The user interface 1402 permits a user to select whether either of the operations ("hello_world" and "webhook") are currently deployed via an endpoint, whether either of the endpoints requires a requester (e.g., client software application) to provide an API key to enable access to the particular endpoint, whether an end user sign-in will be required to access the endpoint (which can determine whether an endpoint is publicly accessible), and whether either of the operations should be deployed as an endpoint comprising a webhook. The user interface 1402 also lists how each of the operations can be accessed via their respective endpoint based on the options selected by the user via the user interface 1402.

Figure 15:
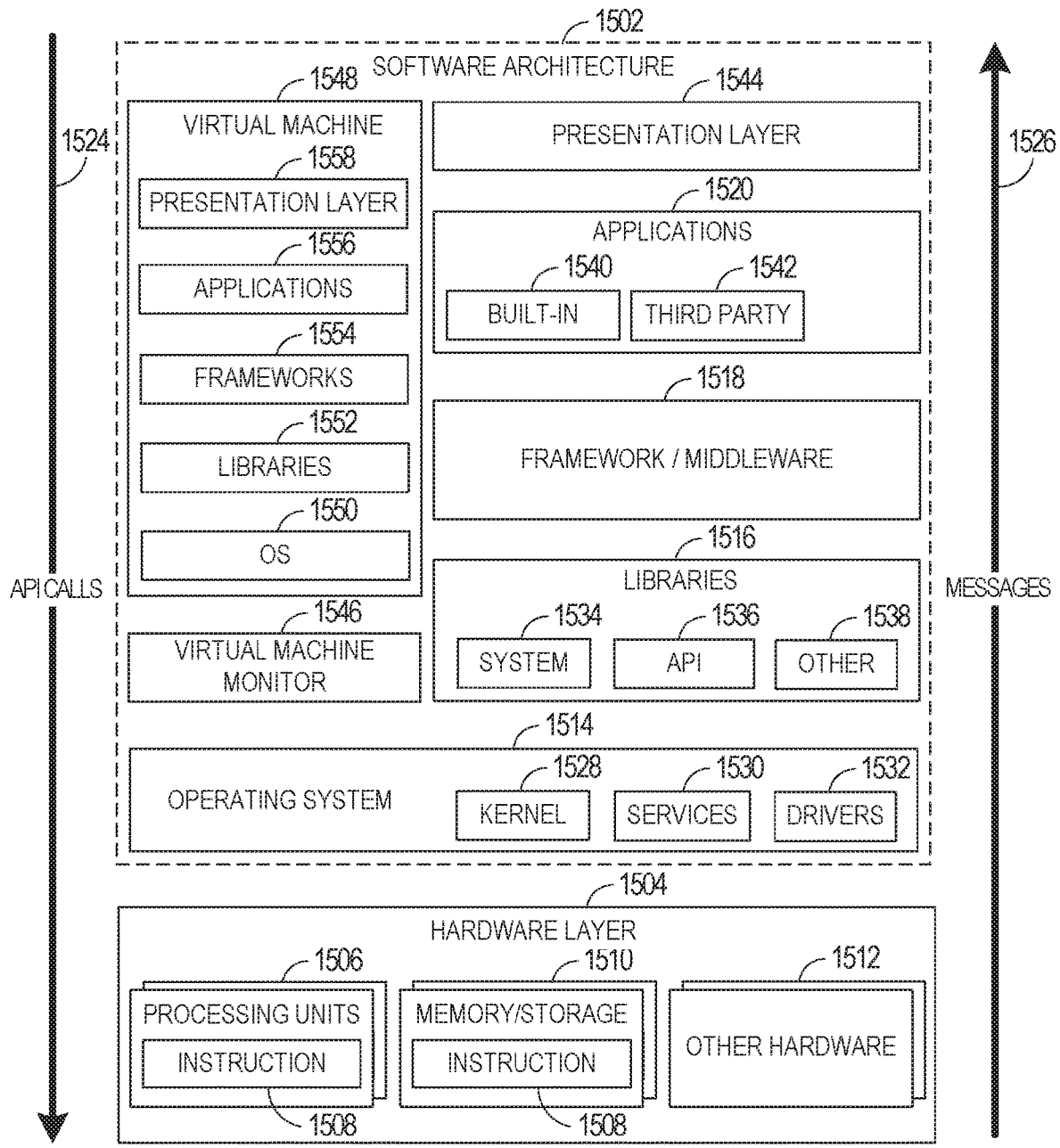
FIG. 15 is a block diagram illustrating a representative software architecture, which may be used in conjunction with various hardware architectures herein described, according to various embodiments of the present disclosure.
Figure 16:
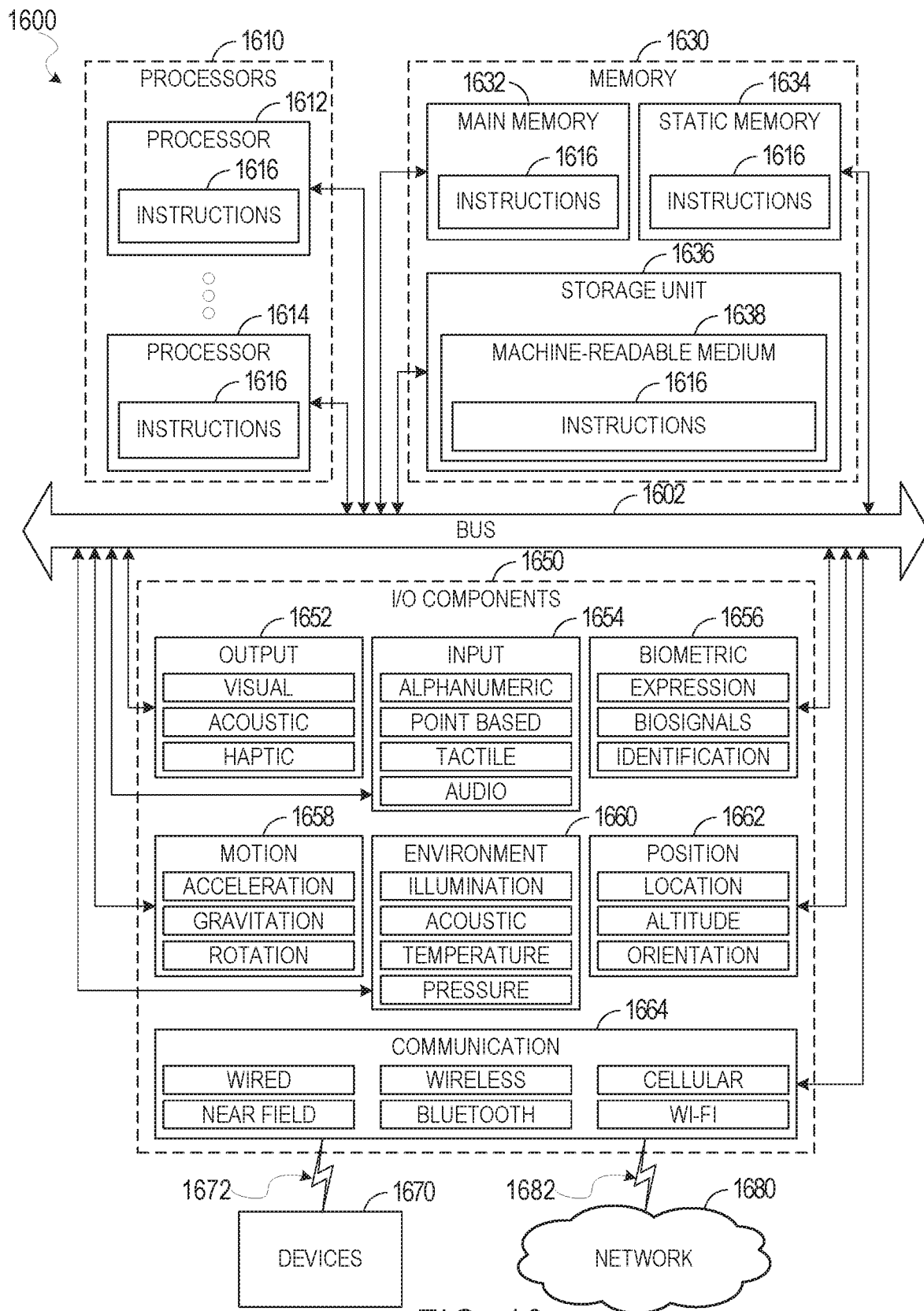
FIG. 16 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 15 or by way of the example machine illustrated by and described with respect to FIG. 16.

FIG. 15 is a block diagram illustrating an example: of a software architecture 1502 that may be installed on a machine, according to some example embodiments. FIG. 15 is merely a non-limiting example of a software architecture, and it will be appreciated that many other architectures may be implemented to facilitate the functionality described herein. The software architecture 1502 may be executing on hardware such as a machine 1600 of FIG. 16 that includes, among other things, processors 1610, memory 1630, and I/O components 1650. A representative hardware layer 1504 is illustrated and can represent, for example, the machine 1600 of FIG. 16. The representative hardware layer 1504 comprises one or more processing units 1506 having associated executable instructions 1508. The executable instructions 1508 represent the executable instructions of the software architecture 1502, including implementation of the methods, modules, and so forth of FIGS. 1-9. The hardware layer 1504 also includes memory or storage modules 1510, which also have the executable instructions 1508. The hardware layer 1504 may also comprise other hardware 1512, which represents any other hardware of the hardware layer 1504, such as the other hardware illustrated as part of the machine 1600.

In the example architecture of FIG. 15, the software architecture 1502 may be conceptualized as a stack of layers, where each layer provides particular functionality. For example, the software architecture 1502 may include layers such as an operating system 1514, libraries 1516, frameworks/middleware 1518, applications 1520, and a presentation layer 1544. Operationally, the applications 1520 or other components within the layers may invoke API calls 1524 through the software stack and receive a response, returned values, and so forth (illustrated as messages 1526) in response to the API calls 1524. The layers illustrated are representative in nature, and not all software architectures have all layers. For example, some mobile or special-purpose operating systems may not provide a frameworks/middleware 1518 layer, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than by interfacing directly with the underlying operating system 1514 functionality (e.g., kernel 1528, services 1530, or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 include built-in applications 1540 and/or third-party applications 1542. Examples of representative built-in applications 1540 may include, but are not limited to, a home application, a contacts application, a browser application, a book reader application, a location application, a media application, a messaging application, or a game application.

The third-party applications 1542 may include any of the built-in applications 1540, as well as a broad assortment of other applications. In a specific example, the third-party applications 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 1542 may invoke the API calls 1524 provided by the mobile operating system such as the operating system 1514 to facilitate functionality described herein.

The applications 1520 may utilize built-in operating system functions (e.g., kernel 1528, services 1530, or drivers 1532), libraries (e.g., system libraries 1534, API libraries 1536, and other libraries 1538), or frameworks/middleware 1518 to create user interfaces to interact with users of the system. Alternatively, or additionally, in some systems, interactions with a user may occur through a presentation layer, such as the presentation layer 1544. In these systems, the application/module "logic" can be separated from the aspects of the application/module that interact with the user.

Some software architectures utilize virtual machines. In the example of FIG. 15, this is illustrated by a virtual machine 1548. The virtual machine 1548 creates a software environment where applications/modules can execute as if they were executing on a hardware machine (e.g., the machine 1600 of FIG. 16). The virtual machine 1548 is hosted by a host operating system (e.g., the operating system 1514) and typically, although not always, has a virtual machine monitor 1546, which manages the operation of the virtual machine 1548 as well as the interface with the host operating system (e.g., the operating system 1514). A software architecture executes within the virtual machine 1548, such as an operating system 1550, libraries 1552, frameworks/middleware 1554, applications 1556, or a presentation layer 1558. These layers of software architecture executing within the virtual machine 1548 can be the same as corresponding layers previously described or may be different.

FIG. 16 illustrates a diagrammatic representation of a machine 1600 in the form of a computer system within which a set of instructions may be executed for causing the machine 1600 to perform any one or more of the methodologies discussed herein, according to an embodiment. Specifically, FIG. 16 shows a diagrammatic representation of the machine 1600 in the example form of a computer system, within which instructions 1616 (e.g., software, a program, an application, an apples, an app, or other executable code) for causing the machine 1600 to perform any one or more of the methodologies discussed herein may be executed. For example, the instructions 1616 may cause the machine 1600 to execute any one of methods 500, 600, 700, 800, 900 described above with respect to FIGS. 5-9. Additionally, or alternatively, the instructions 1616 may implement the software component relational systems of FIGS. 1 and 2. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an embodiment, the processors 1610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1612 and a processor 1614 that may execute the instructions 1616. The term "processor" is intended to include multi-core processors that may comprise two or more independent processors (sometimes referred to as "cores") that may execute instructions contemporaneously. Although FIG. 16 shows multiple processors 1610, the machine 1600 may include a single processor with a single core, a single processor with multiple cores (e.g., a multi-core processor), multiple processors with a single core, multiple processors with multiples cores, or any combination thereof.

The memory 1630 may include a main memory 1632, a static memory 1634, and a storage unit 1636 including machine-readable medium 1638, each accessible to the processors 1610 such as via the bus 1602. The main memory 1632, the static memory 1634, and the storage unit 1636 store the instructions 1616 embodying any one or more of the methodologies or functions described herein. The instructions 1616 may also reside, completely or partially, within the main memory 1632, within the static memory 1634, within the storage unit 1636, within at least one of the processors 1610 (e.g., within the processor's cache memory), or any suitable combination thereof, during execution thereof by the machine 1600.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16, The I/O components 1650 are grouped according to functionality merely for simplifying the following discussion, and the grouping is in no way limiting. In various embodiments, the I/O components 1650 may include output components 1652 and input components 1654. The output components 1652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1650 may include biometric components 1656, motion components 1658, environmental components 1660, or position components 1662, among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or another suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1600, but deployed across a number of machines 1600. In some example embodiments, the processors 1610 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 1630, 1632, 1634, and/or the memory of the processor(s) 1610) and/or the storage unit 1636 may store one or more sets of instructions 1616 and data structures (e.g., software) embodying or utilized by any one or more of the methodologies or functions described herein. These instructions (e.g., the instructions 1616), when executed by the processor(s) 1610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1616 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
   receiving, by a hardware processor, input data from a first client device; and
   based on the input data:
   generating, by the hardware processor, a software component environment;
   associating, by the hardware processor, the software component environment with a set of data connections to a set of external software services, the set of external software services being available for use by an operation associated with the software component environment;
   associating, by the hardware processor, the software component environment with first data connection setting information for a first data connection in the set of data connections, the first data connection providing access to a first data source of a first external software service, the first data connection setting information specifying use of first stored authentication information, associated with the software component environment, to establish access to the first external software service through the first data connection;
   associating, by the hardware processor, the software component environment with second data connection setting information for a second data connection in the set of data connections, the second data connection providing access to a second data source of a second external software service the second data connection setting information specifying use of second stored authentication information, associated with the software component environment, to establish access to the second external software service through the second data connection, the second stored authentication information being different from the first stored authentication information;
   associating, by the hardware processor, operation logic data with the software component environment, the operation logic data describing logic for performing an operation, the first data connection being used within the logic as a first virtual data source and the second data connection being used within the logic as a second virtual data source, the logic being configured to translate to a set of actions performed with respect to the first data source, via the first data connection, and a second data source, via the second data connection, when the operation is executed; and
   generating, by the hardware processor, an endpoint for receiving requests to perform the operation, the endpoint being associated with the software component environment, and the endpoint being configured to be interfaced by a client software application to invoke the operation.

2. The method of claim 1, further comprising:
   based on the input data:
   generating, by the hardware processor, the first stored authentication information.

3. The method of claim 2, wherein the generating the first stored authentication information comprises:
   authenticating with the first external software service based on credentials of an external user account provided by an administrative user at the first client device;
   receiving an authentication token from the first external software service upon successful authentication based on the credentials of the external user account; and
   storing the authentication token as the first stored authentication information.

4. The method of claim 3, wherein the authenticating with the first external software service based on credentials of the external user account provided by the administrative user at the first client device comprises:
  causing a sign-in page associated with the external user account to appear on the first client device.

5. The method of claim 1, wherein the second stored authentication information comprises end user-provided authentication information, the method further comprising:
  generating the end user-provided authentication information by:
    authenticating with the second external software service based on credentials of an external user account provided by an end user at a second client device;
    receiving an authentication token from the second external software service upon successful authentication based on the credentials of the external user account; and
    storing the authentication token as the stored end user-provided authentication information.

6. The method of claim 5, wherein the generating the stored end user-provided authentication information further by:
  associating the stored end user-provided authentication information with a user account of the end user used to access the endpoint.

7. The method of claim 5, wherein the authenticating with the second external software service based on credentials of the external user account provided by the end user at the second client device comprises:
  causing a sign-in page associated with the external user account to appear on the second client device.

8. The method of claim 1, further comprising:
  determining, by the hardware processor, whether the first stored authentication information has expired; and
  in response to determining that the first stored authentication information has expired, refreshing, by the hardware processor, the first stored authentication information with the first external software service.

9. The method of claim 1, further comprising:
  determining, by the hardware processor, whether authentication based on the first stored authentication information has failed when attempting to establish access to the first external software service through the first data connection; and
  in response to determining that authentication based on the first stored authentication information has failed, retrying, by the hardware processor, authentication based on the first stored authentication information.

10. A system comprising:
  a memory storing instructions; and
  one or more hardware processors communicatively coupled to the memory and configured by the instructions to perform operations comprising:
    receiving input data from a first client device; and
    based on the input data:
      generating a software component environment;
      associating the software component environment with a set of data connections to a set of external software services, the set of external software services being available for use by an operation associated with the software component environment;
      associating the software component environment with first data connection setting information for a first data connection in the set of data connections, the first data connection providing access to a first data source of a first external software service, the first data connection setting information specifying use of first stored authentication information, associated with the software component environment, to establish access to the first external software service through the first data connection;
      associating the software component environment with second data connection setting information for a second data connection in the set of data connections, the second data connection providing access to a second data source of a second external software service, the second data connection setting information specifying use of second stored authentication information, associated with the software component environment, to establish access to the second external software service through the second data connection, the second stored authentication information being different from the first stored authentication information;
      associating operation logic data with the software component environment, the operation logic data describing logic for performing an operation, the first data connection being used within the logic as a first, virtual data source and the second data connection being used within the logic as a second virtual data source, the logic being configured to translate to a set of actions performed with respect to the first data source, via the first data connection, and a second data source, via the second data connection, when the operation is executed; and
      generating an endpoint for receiving a request for performing the operation, the endpoint being associated with the software component environment, and the endpoint being configured to be interfaced by a client software application to invoke the operation.

11. The system of claim 10, wherein the operations further comprise:
  based on the input data:
    generating the first stored authentication information by:
      authenticating with the first external software service based on credentials of an external user account provided by an administrative user at the first client device;
      receiving an authentication token from the first external software service upon successful authentication based on the credentials of the external user account; and
      storing the authentication token as the first stored authentication information.

12. The system of claim 11, wherein the authenticating with the first external software service based on credentials of the external user account provided by the administrative user at the first client device comprises:
  causing a sign-in page associated with the external user account to appear on the first client device.

13. The system of claim 10, wherein the second stored authentication information comprises end user-provided authentication information, the operations further comprising:
  generating the end user-provided authentication information by:
    authenticating with the second external software service based on credentials of an external user account provided by an end user at a second client device;

receiving an authentication token from the second external software service upon successful authentication based on the credentials of the external user account; and storing the authentication token as the stored end user-provided authentication information.

14. The system of claim 13, wherein the generating the stored end user-provided authentication information further by:

associating the stored end user-provided authentication information with a user account of the end user used to access the endpoint.

15. The system of claim 13, wherein the authenticating with the second external software service based on credentials of the external user account provided by the end user at the second client device comprises:

causing a sign-in page associated with the external user account to appear on the second client device.

16. The system of claim 10, wherein the operations further comprises:

determining whether the first stored authentication information has expired; and in response to determining that the first stored authentication information has expired, refreshing the first stored authentication information with the first external software service.

17. The system of claim 10, wherein the operations further comprise:

determining whether authentication based on the first stored authentication information has failed when attempting to establish access to the first external software service through the first data connection; and in response to determining that authentication based on the first stored authentication information has failed, retrying authentication based on the first stored authentication information.

18. A non-transitory computer-readable medium comprising instructions that, when executed by a hardware processor of a device, cause the device to perform operations comprising:

receiving input data from a client device; and based on the input data:

generating a software component environment;

associating the software component environment with a set of data connections to a set of external software services, the set of external software services being available for use by an operation associated with the software component environment;

associating the software component environment with first data connection setting information for a first data connection in the set of data connections, the first data connection providing access to a first data source of a first external software service, the first data connection setting information specifying use of first stored authentication information, associated with the software component environment, to establish access to the first external software service through the first data connection;

associating the software component environment with second data connection setting information for a second data connection in the set of data connections, the second data connection providing access to a second data source of a second external software service, the second data connection setting information specifying use of second stored authentication information, associated with the software component environment, to establish access to the second external software service through the second data connection, the second stored authentication information being different from the first stored authentication information;

associating operation logic data with the software component environment, the operation logic data describing logic for performing an operation, the first data connection being used within the logic as a first virtual data source and the second data connection being used within the logic as a second virtual data source, the logic being configured to translate to a set of actions performed with respect to the first data source, via the first data connection, and a second data source, via the second data connection, when the operation is executed; and generating an endpoint for receiving a request for performing the operation, the endpoint being associated with the software component environment, and the endpoint being configured to be interfaced by a client software application to invoke the operation.

19. The non-transitory computer-readable medium of claim 18, wherein the second stored authentication information comprises end user-provided authentication information, the operations further comprising:

generating the end user-provided authentication information by:

authenticating with the second external software service based on credentials of an external user account provided by an end user at a second client device;

receiving an authentication token from the second external software service upon successful authentication based on the credentials of the external user account; and storing the authentication token as the end user-provided authentication information.

20. The non-transitory computer-readable medium of claim 18, wherein the operations further comprise:

determining whether the first stored authentication information has expired; and in response to determining that the first stored authentication information has expired, refreshing the first stored authentication information with the first external software service.

* * * * *